US012068987B2

(12) United States Patent
Abedini et al.

(10) Patent No.: US 12,068,987 B2
(45) Date of Patent: Aug. 20, 2024

(54) TECHNIQUES FOR MANAGING PARTIALLY OVERLAPPING TRANSMISSION AND RECEPTION

(71) Applicant: QUALCOMM Incorporated, San Diego, CA (US)

(72) Inventors: Navid Abedini, Basking Ridge, NJ (US); Qian Zhang, Basking Ridge, NJ (US); Kapil Gulati, Belle Mead, NJ (US); Junyi Li, Fairless Hills, PA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 17/404,734

(22) Filed: Aug. 17, 2021

(65) Prior Publication Data

US 2023/0054255 A1 Feb. 23, 2023

(51) Int. Cl.
*H04L 5/00* (2006.01)
*H04L 5/14* (2006.01)

(52) U.S. Cl.
CPC .............. *H04L 5/0048* (2013.01); *H04L 5/14* (2013.01)

(58) Field of Classification Search
CPC ....... H04L 5/0048; H04L 5/14; H04L 5/0051; H04L 5/0096
See application file for complete search history.

(56) References Cited

U.S. PATENT DOCUMENTS

| 2016/0174238 | A1* | 6/2016 | Chen ...................... H04W 72/56 370/336 |
| 2016/0183264 | A1* | 6/2016 | Rasmussen ....... H04M 1/72505 370/329 |
| 2016/0337107 | A1* | 11/2016 | Tabet ........................ H04L 5/16 |
| 2017/0289992 | A1* | 10/2017 | Sun ........................ H04W 72/21 |

(Continued)

FOREIGN PATENT DOCUMENTS

| WO | WO-2021133616 A1 | 7/2021 |
| WO | WO-2021133974 A1 | 7/2021 |

(Continued)

OTHER PUBLICATIONS

International Search Report and Written Opinion—PCT/US2022/037712—ISA/EPO—Oct. 17, 2022.

*Primary Examiner* — Afshawn M Towfighi
*Assistant Examiner* — Sun Jong Kim
(74) *Attorney, Agent, or Firm* — Dalei Dong; Holland & Hart LLP

(57) ABSTRACT

Methods, systems, and devices for wireless communications are described. A first wireless device such as a user equipment (UE) may determine to transition from a first duplexing mode to a second duplexing mode, where a first communication associated with the first duplexing mode at least partially overlaps in time with a second communication associated with the second duplexing mode. Based on the overlap, the UE may identify transition information for coordinating the transition between the first duplexing mode and the second duplexing mode. Using the transition information, the UE may transition from the first duplexing mode to the second duplexing mode, and may communicate with a second wireless device, such as a base station, using the second duplexing mode.

29 Claims, 20 Drawing Sheets

(56) References Cited

U.S. PATENT DOCUMENTS

2019/0261247 A1* 8/2019 Wang .................... H04W 48/04
2019/0357226 A1* 11/2019 Lin ....................... H04L 5/0055
2020/0059327 A1* 2/2020 Kini ....................... H04L 43/06

FOREIGN PATENT DOCUMENTS

| WO | WO-2022010905 A1 | 1/2022 |
| WO | WO-2022076312 A1 | 4/2022 |

* cited by examiner

TECHNIQUES FOR MANAGING PARTIALLY OVERLAPPING TRANSMISSION AND RECEPTION

FIELD OF DISCLOSURE

The following relates to wireless communications, including techniques for managing partially overlapping transmission and reception.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications devices may support both half-duplex communications and full-duplex communications for enhanced system flexibility and efficiency. In some cases, however, techniques for using both half-duplex and full-duplex communications modes may be improved.

SUMMARY

The described techniques relate to improved methods, systems, devices, and apparatuses that support techniques for managing partially overlapping transmission and reception. For example, the described techniques provide for a scheduling device (e.g., a base station) to determine a transition configuration for coordinating a transition between a first communication associated with the first duplexing mode and a second communication associated with the second duplexing mode. The receiving device (e.g., a user equipment (UE)) may use the transition configuration for performing the transition from half-duplex operations to full-duplex operations. Specifically, the transition configuration may include demodulation reference signal (DMRS) placement information such as a DMRS pattern which avoids DMRS placement during the transition, an indication of symbols affected by the transition, an enhanced feedback mechanism, among other information. In some examples, the transition configuration may allow the UE to accurately perform channel estimation and maintain phase continuity when transitioning from half-duplex operations to full-duplex operations.

A method for wireless communications at a first wireless device is described. The method may include transitioning from a first duplexing mode to a second duplexing mode of the first wireless device, where a first communication associated with the first duplexing mode at least partially overlaps in time with a second communication associated with the second duplexing mode, identifying transition information for coordinating the first communication associated with the first duplexing mode and the second communication associated with the second duplexing mode based on the overlap, transitioning from the first duplexing mode to the second duplexing mode in accordance with the transition information, and communicating with a second wireless device using the second duplexing mode.

An apparatus for wireless communications at a first wireless device is described. The apparatus may include a processor, memory coupled with the processor, and instructions stored in the memory. The instructions may be executable by the processor to cause the apparatus to transition from a first duplexing mode to a second duplexing mode of the first wireless device, where a first communication associated with the first duplexing mode at least partially overlaps in time with a second communication associated with the second duplexing mode, identify transition information for coordinating the first communication associated with the first duplexing mode and the second communication associated with the second duplexing mode based on the overlap, transition from the first duplexing mode to the second duplexing mode in accordance with the transition information, and communicate with a second wireless device using the second duplexing mode.

Another apparatus for wireless communications at a first wireless device is described. The apparatus may include means for transitioning from a first duplexing mode to a second duplexing mode of the first wireless device, where a first communication associated with the first duplexing mode at least partially overlaps in time with a second communication associated with the second duplexing mode, means for identifying transition information for coordinating the first communication associated with the first duplexing mode and the second communication associated with the second duplexing mode based on the overlap, means for transitioning from the first duplexing mode to the second duplexing mode in accordance with the transition information, and means for communicating with a second wireless device using the second duplexing mode.

A non-transitory computer-readable medium storing code for wireless communications at a first wireless device is described. The code may include instructions executable by a processor to transition from a first duplexing mode to a second duplexing mode of the first wireless device, where a first communication associated with the first duplexing mode at least partially overlaps in time with a second communication associated with the second duplexing mode, identify transition information for coordinating the first communication associated with the first duplexing mode and the second communication associated with the second duplexing mode based on the overlap, transition from the first duplexing mode to the second duplexing mode in accordance with the transition information, and communicate with a second wireless device using the second duplexing mode.

In some examples of the method, apparatuses, and non-transitory computer-readable medium described herein, the transition information includes a DMRS placement configuration and the method, apparatuses, and non-transitory computer-readable medium may include further operations, features, means, or instructions for receiving the DMRS placement configuration from the second wireless device and transmitting uplink DMRS in symbols occurring before and after the overlap in accordance with the DMRS placement configuration.

In some examples of the method, apparatuses, and non-transitory computer-readable medium described herein, the transition information includes a DMRS placement configuration and the method, apparatuses, and non-transitory computer-readable medium may include further operations, features, means, or instructions for receiving, from the second wireless device, downlink DMRS in symbols occurring before and after the overlap in accordance with the DMRS placement configuration.

In some examples of the method, apparatuses, and non-transitory computer-readable medium described herein, the transition information includes a DMRS placement configuration and the method, apparatuses, and non-transitory computer-readable medium may include further operations, features, means, or instructions for transmitting, to the second wireless device, assistance information including a first set of locations for transmitting DMRS requested by the first wireless device based on the overlap.

Some examples of the method, apparatuses, and non-transitory computer-readable medium described herein may further include operations, features, means, or instructions for receiving, from the second wireless device, a configuration indicating a second set of locations for transmitting DMRS, where the second set of locations may be different from the first set of locations and transmitting the assistance information to notify the second wireless device of the requested first set of locations.

In some examples of the method, apparatuses, and non-transitory computer-readable medium described herein, the assistance information indicates a requested number of symbols for transmitting the DMRS, a requested location of symbols for transmitting the DMRS, a number of symbols associated with the transition from the first duplexing mode to the second duplexing mode, or any combination thereof.

In some examples of the method, apparatuses, and non-transitory computer-readable medium described herein, the transition information includes a transition duration configuration and the method, apparatuses, and non-transitory computer-readable medium may include further operations, features, means, or instructions for receiving the transition duration configuration from the second wireless device, where the transition duration configuration indicates a number of symbols affected by the transition from the first duplexing mode to the second duplexing mode.

Some examples of the method, apparatuses, and non-transitory computer-readable medium described herein may further include operations, features, means, or instructions for refraining from communicating with the second wireless device during the number of symbols affected by the transition in accordance with the transition duration configuration.

Some examples of the method, apparatuses, and non-transitory computer-readable medium described herein may further include operations, features, means, or instructions for receiving the transition duration configuration via a medium access control-control element (MAC-CE), a downlink control information (DCI), radio resource control (RRC) message, or any combination thereof.

In some examples of the method, apparatuses, and non-transitory computer-readable medium described herein, the transition duration configuration may be based on respective slot formats associated with one or more slots associated with the transition.

In some examples of the method, apparatuses, and non-transitory computer-readable medium described herein, the transition information includes a feedback configuration and the method, apparatuses, and non-transitory computer-readable medium may include further operations, features, means, or instructions for determining that the first communication and the second communication may be unsuccessfully received by the first wireless device over one or more overlapping symbols and transmitting a feedback transmission indicating the unsuccessful receipt in accordance with the feedback configuration.

In some examples of the method, apparatuses, and non-transitory computer-readable medium described herein, the feedback transmission includes a multi-bit feedback transmission.

Some examples of the method, apparatuses, and non-transitory computer-readable medium described herein may further include operations, features, means, or instructions for receiving the feedback configuration from the second wireless device via RRC signaling.

In some examples of the method, apparatuses, and non-transitory computer-readable medium described herein, the feedback transmission includes a request for the second wireless device to retransmit the first communication associated with the first duplexing mode, the second communication associated with the second duplexing mode, or both.

In some examples of the method, apparatuses, and non-transitory computer-readable medium described herein, the transition information includes a cancellation configuration and the method, apparatuses, and non-transitory computer-readable medium may include further operations, features, means, or instructions for cancelling one or more overlapping symbols associated the first communication and the second communication and transmitting, to the second wireless device, an indication of the cancellation in accordance with the cancellation configuration.

In some examples of the method, apparatuses, and non-transitory computer-readable medium described herein, the indication of the cancellation may be multiplexed with the first communication, the second communication, or both.

Some examples of the method, apparatuses, and non-transitory computer-readable medium described herein may further include operations, features, means, or instructions for switching the first communication and the second communication from a first transport block to a second transport block in accordance with the cancellation configuration.

In some examples of the method, apparatuses, and non-transitory computer-readable medium described herein, the transition information includes a multi-connection configuration and the method, apparatuses, and non-transitory computer-readable medium may include further operations, features, means, or instructions for receiving the multi-connection configuration from the second wireless device, a third wireless device, or both, where the multi-connection configuration includes a DMRS placement pattern based on the overlap and communicating with the second wireless device and the third wireless device in accordance with the multi-connection configuration.

Some examples of the method, apparatuses, and non-transitory computer-readable medium described herein may further include operations, features, means, or instructions for transmitting, to the second wireless device, the third wireless device, or both, assistance information including a first set of requested locations for transmitting DMRS based on the overlap.

In some examples of the method, apparatuses, and non-transitory computer-readable medium described herein, the first duplexing mode and the second duplexing mode include either a half-duplexing mode or a full-duplexing mode.

A method for wireless communications at a second wireless device is described. The method may include transmitting, to a first wireless device, transition information for coordinating an overlap of a first communication associated with a first duplexing mode and a second communication associated with a second duplexing mode, where the first wireless device is to transition from the first duplexing mode to the second duplexing mode during the overlap and communicating with the first wireless device in accordance with the transition information.

An apparatus for wireless communications at a second wireless device is described. The apparatus may include a processor, memory coupled with the processor, and instructions stored in the memory. The instructions may be executable by the processor to cause the apparatus to transmit, to a first wireless device, transition information for coordinating an overlap of a first communication associated with a first duplexing mode and a second communication associated with a second duplexing mode, where the first wireless device is to transition from the first duplexing mode to the second duplexing mode during the overlap and communicate with the first wireless device in accordance with the transition information.

Another apparatus for wireless communications at a second wireless device is described. The apparatus may include means for transmitting, to a first wireless device, transition information for coordinating an overlap of a first communication associated with a first duplexing mode and a second communication associated with a second duplexing mode, where the first wireless device is to transition from the first duplexing mode to the second duplexing mode during the overlap and means for communicating with the first wireless device in accordance with the transition information.

A non-transitory computer-readable medium storing code for wireless communications at a second wireless device is described. The code may include instructions executable by a processor to transmit, to a first wireless device, transition information for coordinating an overlap of a first communication associated with a first duplexing mode and a second communication associated with a second duplexing mode, where the first wireless device is to transition from the first duplexing mode to the second duplexing mode during the overlap and communicate with the first wireless device in accordance with the transition information.

In some examples of the method, apparatuses, and non-transitory computer-readable medium described herein, the transition information includes a DMRS placement configuration and the method, apparatuses, and non-transitory computer-readable medium may include further operations, features, means, or instructions for determining a set of multiple symbols allocated for DMRS based on a location of the overlap, transmitting the DMRS placement configuration including an indication of the allocated symbols to the second wireless device, and receiving uplink DMRS in symbols occurring before and after the overlap in accordance with the DMRS placement configuration.

In some examples of the method, apparatuses, and non-transitory computer-readable medium described herein, the transition information includes a DMRS placement configuration and the method, apparatuses, and non-transitory computer-readable medium may include further operations, features, means, or instructions for transmitting downlink DMRS in symbols occurring before and after the overlap in accordance with the DMRS placement configuration.

In some examples of the method, apparatuses, and non-transitory computer-readable medium described herein, the transition information includes a DMRS placement configuration and the method, apparatuses, and non-transitory computer-readable medium may include further operations, features, means, or instructions for receiving, from the first wireless device, assistance information including a first set of locations for transmitting DMRS requested by the first wireless device based on the overlap.

Some examples of the method, apparatuses, and non-transitory computer-readable medium described herein may further include operations, features, means, or instructions for transmitting, to the first wireless device, a configuration indicating a second set of locations for transmitting DMRS, where the second set of locations may be different from the first set of locations and receiving the assistance information including the requested first set of locations.

In some examples of the method, apparatuses, and non-transitory computer-readable medium described herein, the assistance information indicates a requested number of symbols for transmitting the DMRS, a requested location of symbols for transmitting the DMRS, a number of symbols associated with the transition from the first duplexing mode to the second duplexing mode, or any combination thereof.

In some examples of the method, apparatuses, and non-transitory computer-readable medium described herein, the transition information includes a transition duration configuration and the method, apparatuses, and non-transitory computer-readable medium may include further operations, features, means, or instructions for transmitting the transition duration configuration to the first wireless device, where the transition duration indicates a number of symbols affected by the transition from the first duplexing mode to the second duplexing mode.

Some examples of the method, apparatuses, and non-transitory computer-readable medium described herein may further include operations, features, means, or instructions for transmitting the transition duration configuration via a MAC-CE, a DCI, RRC message, or any combination thereof.

DETAILED DESCRIPTION

Figure 1:
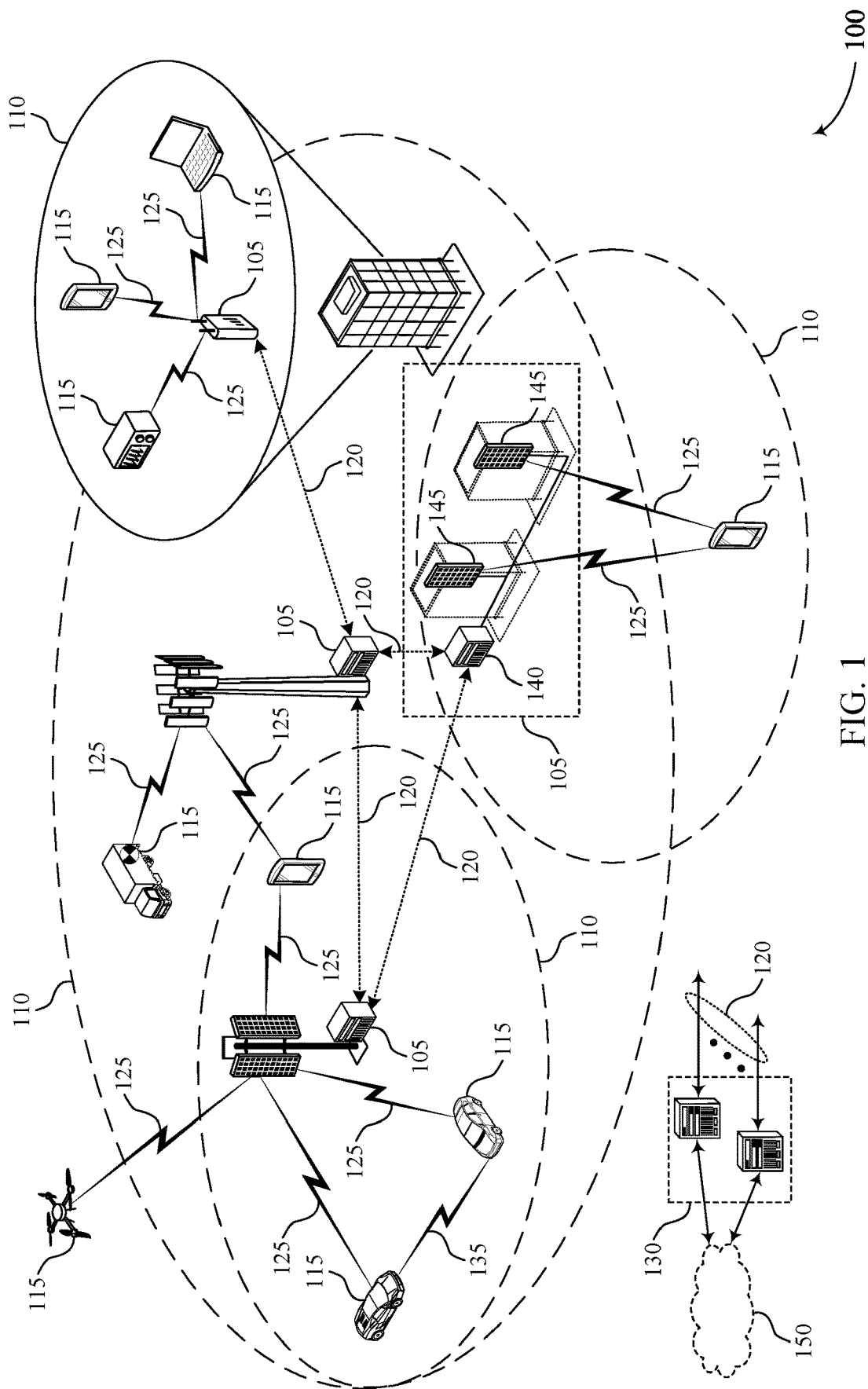
FIG. 1 illustrates an example of a wireless communications system that supports techniques for managing partially overlapping transmission and reception in accordance with aspects of the present disclosure.

Some wireless communication devices may be capable of performing both half-duplex and full-duplex operations to support efficient communications in a wireless communications network. For example, enabling both half-duplex and full-duplex communications may increase system throughput while reducing signaling overhead and latency. In some cases, a user equipment (UE) may operate in a half-duplex mode to communicate with a base station during a first portion of a slot, and then may subsequently switch to full-duplex operations at a later time in the slot. The transition from half-duplex operations to full-duplex operations by the UE, however, may be associated with a switching time on the order of one or a few symbols. For example, in some cases, the UE may puncture or cancel one or more symbols at the transition in order to prepare for switching between a half-duplex mode and a full-duplex mode, or vice versa.

In some examples, the base station and the UE may switch from half-duplex to full-duplex in between communications slots to preserve phase continuity. In some other examples, however, the UE may switch from half-duplex operations to full-duplex operations in the same communications slot, which my lead to puncturing or loss of phase continuity for ongoing communications. Aspects of the present disclosure discuss techniques for switching from half-duplex to full-duplex operations in a single communications slot while preserving phase continuity and minimizing symbol puncturing. For example, a base station may determine a transition configuration that the UE may use to accommodate for possible reduced performance based on the transition between half-duplex and full-duplex modes.

In some cases, the transition configuration may include a demodulation reference signal (DMRS) placement configuration that avoids the overlap in order to ensure piece-wise channel estimation. For example, a symbol scheduled for DMRS (e.g., and therefore channel estimation) may coincide with a switching symbol, which may result in one or more portions of the DMRS being punctured or canceled. The transition configuration may in some examples indicate symbols other than a set of switching symbols to perform channel estimation and preserve phase continuity.

In some examples, the UE may assist the base station in determining the transition configuration and the scheduling by transmitting assistance information to the base station which indicates a number of requested symbols for scheduling DMRS. Additionally or alternatively, the base station may indicate symbols to the UE that may be used for transitioning or puncturing, and the UE may refrain from transmitting information during the transition symbols. In some other examples, the transition configuration may include an enhanced feedback mechanism that the UE may use in cases when prior coordination was not feasible between the UE and the base station. For example, the UE may provide multi-bit feedback indicating communications that were incorrectly received or canceled, or in some other cases the feedback may include a request to retransmit one or more communications affected by the transition.

By ensuring phase continuity and minimizing puncturing during transitions from half-duplex operations to full-duplex operations, the techniques described herein may reduce signaling overhead, increase throughput, and decrease latency in the wireless communications system.

Aspects of the disclosure are initially described in the context of wireless communications systems. Aspects of the disclosure are further illustrated by and described with reference to apparatus diagrams, system diagrams, slot configurations, a process flow, and flowcharts that relate to techniques for managing partially overlapping transmission and reception.

FIG. 1 illustrates an example of a wireless communications system 100 that supports techniques for managing partially overlapping transmission and reception in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions in the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The described techniques relate to improved methods, systems, devices, and apparatuses that support techniques for switching from half-duplex operations to full-duplex operations within a slot. In some cases, the techniques described herein may ensure phase continuity while minimizing symbol puncturing at times where transmissions and receptions associated with a transition between communication modes at least partially overlap. For example, a UE 115 may be scheduled to perform a half-duplex operation over a full communication slot (e.g., receiving downlink information), and may identify full-duplex operations that are to be activated later (e.g., near the end of the slot).

In some cases, the base station 105 may determine a transition configuration to coordinate the switching between communication modes, and may subsequently transmit an indication of a transition configuration to the UE 115. In some examples, the transition configuration may be a DMRS placement configuration which indicates locations of DMRS such that the DMRS may not overlap with one or more symbols that may be used for transitioning from half-duplex to full-duplex. In some cases, the UE 115 may provide assisting information to the base station 105 for configuring a DMRS pattern. For example, the UE 115 may indicate a DMRS configuration other than a current DMRS configuration (e.g., for downlink or uplink), a number or location of DMRS symbols, a number or location of symbols the UE 115 may utilize for switching, or some combination thereof.

In some examples, the transition configuration may include an enhanced feedback configuration, and the UE 115 may utilize enhanced feedback (e.g., multi-bit feedback) to request a retransmission of one or more communications, or to indicate that one or more communications were incorrectly received. In some instances, if the UE 115 is transitioning from transmitting to the base station 105 in half-duplex to full-duplex operations, the UE may later indicate which symbols, if any, were canceled.

By utilizing the aforementioned techniques to switch from half-duplex operations to full-duplex operations, overall network efficiency of the wireless communications system may be increased. For example, by ensuring phase continuity, signaling overhead and latency may be reduced. Additionally or alternatively, by minimizing symbol puncturing, the wireless communications system may reduce the number of retransmissions which may further improve latency and signaling overhead in the network.

Figure 2:
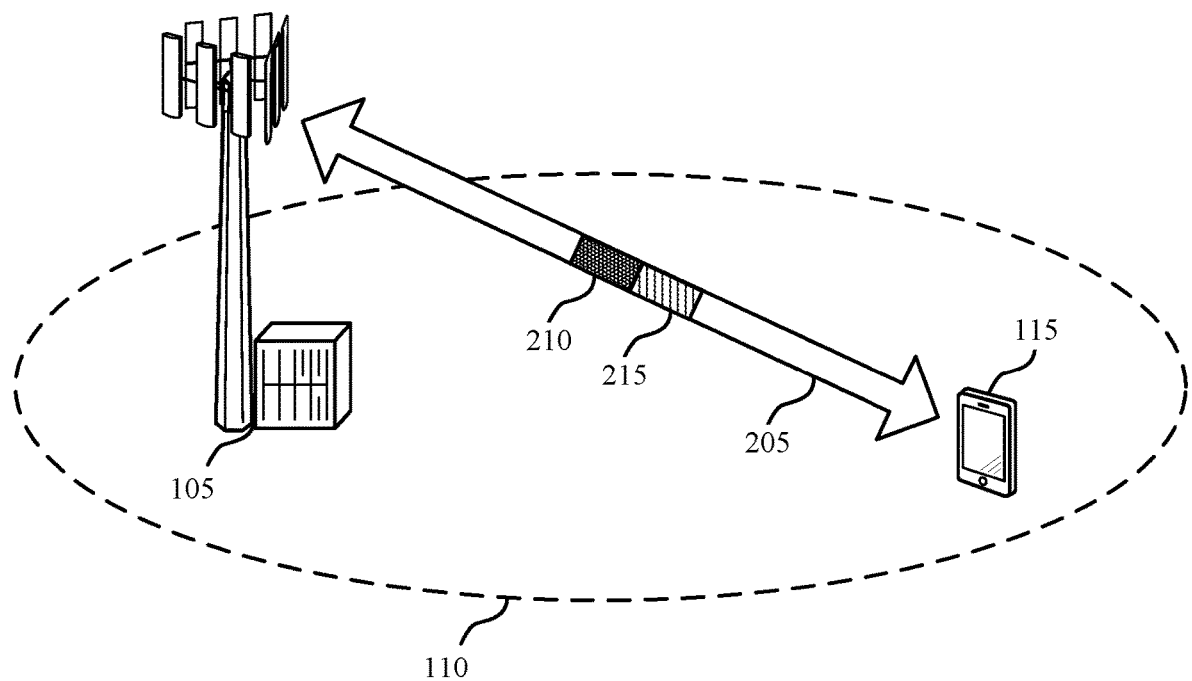
FIG. 2 illustrates an example of a wireless communications system that supports techniques for managing partially overlapping transmission and reception in accordance with aspects of the present disclosure.

FIG. 2 illustrates an example of a wireless communications system 200 that supports techniques for managing partially overlapping transmission and reception in accordance with aspects of the present disclosure. The wireless communications system 200 may include a base station 105 and a UE 115, which may be examples of a base station 105 and a UE 115 as described with reference to FIG. 1. The base station 105-*a* may serve a geographic coverage area 110, which may be an example of a geographic coverage area 110 as described with reference to FIG. 1. In some cases, the wireless communications system 200 may support full-duplex operations, half-duplex operations, or both. For example, at least one of the UE 115 and the base station 105 may have a full-duplexing capability for simultaneous transmission and reception of communications.

The wireless communications system 200 may employ one or more techniques (e.g., signaling techniques) to manage partially overlapping transmissions and receptions. Specifically, the techniques described in the present disclosure provide for coordinating communications between the UE 115 and the base station 105 in cases where either device (or both devices) transition between a first duplexing mode and a second duplexing mode during ongoing communications. For example, the UE 115 may initially communicate with the base station 105 using half-duplex operations in a communications slot, and then later switch to performing full-duplex operations (e.g., in the later half or in the last few symbols) of the communication slot. Such switching between communication modes, however, may impact phase continuity of the ongoing communications within the slot, or may cause some symbols to be punctured or canceled due to a preparation and adjustment period the UE 115 may use for switching. Accordingly, by utilizing one or more signaling techniques, the UE 115 and the base station 105 may maintain phase continuity across the communication slot while minimizing symbol puncturing due to the transition from half-duplex to full-duplex modes.

As described in further detail herein, FIG. 2 illustrates an example of a wireless communications system that may support one or more signaling techniques for reducing the system impact of overlapping transmissions and receptions for devices with half-duplex and full-duplex capabilities. It should be noted, however, that the following techniques may be implemented by any number of wireless devices (e.g., integrated access and backhaul (IAB) nodes, relay units, distributed units (DUs), gNodeB (gNB), and the like) over a number of channels (e.g., downlink, uplink, sidelink). Additionally, while two devices are illustrated in FIG. 2, any number of devices (e.g., a UE communicating with two other UEs) may utilize the following techniques to manage partially overlapping transmissions and receptions to avoid loss of phase continuity and minimize puncturing at the devices.

The base station 105 and the UE 115 may perform communications (e.g., uplink and downlink communications) over a communications link 205. In some cases, the UE 115 may perform half-duplex operations during a full communications slot to receive downlink information from the base station 105. In some examples, however, while the half-duplex operations within the communication slot are ongoing, the UE 115 may identify full-duplex operations (e.g., receiving downlink information from the base station 105 while transmitting uplink information to the base station 105) that are to be activated later in the communications slot such that the half-duplex operations and the full-duplex operations may overlap.

In such examples, both communicating devices (e.g., the UE 115 and the base station 105) are capable of full-duplex operations and may initially perform half-duplex operations in a slot and later transition to full-duplex operations (simultaneous transmission and reception). Switching between half-duplex and full-duplex modes at the UE 115, however, may take time (e.g., switching time may be on the order of one to a few symbols) to prepare for the full-duplex operation as well as transition from half-duplex to full-duplex. The time associated with switching from half-duplex to full-duplex may impact performance of the ongoing communication because to accommodate the switching the UE may puncture or cancel one or more symbols. In addition, the switching process may impact phase continuity for the half-duplex communications, the full-duplex communications, or both.

To reduce the impact of switching between half-duplex communications and full-duplex communications (or vice-versa) and to coordinate the transition between ongoing communications and overlapping scheduled transmissions, the UE 115 may implement a number of techniques. For example, the UE 115 may utilize a transition configuration 210 for coordinating a first communication (e.g., receiving downlink information from the base station 105) associated with a first duplexing mode (e.g., half-duplex) and a second communication (e.g., uplink transmissions to the base station 105) associated with a second duplexing mode (e.g., full-duplex) based on the degree of overlap between the half-duplex communications and the full-duplex communications. For example, the UE 115 may utilize the transition configuration 210 to transition from half-duplex to full-duplex operations without loss of phase continuity and while minimizing symbol puncturing within symbols corresponding to the overlap of the half-duplex and the full-duplex operations.

In some cases, the base station 105 may determine the transition configuration 210, as well as associated scheduling for the UE 115 to use. For example, the transition configuration 210 may be a DMRS placement configuration that may be implemented by the UE 115 to reduce the impact of the transition by ensuring that the DMRS is not impacted by the transition, and so that DMRS can be used for acute channel estimation. That is, the base station 105 may schedule enough DMRS to ensure piece-wise channel estimation by selecting the location of the DMRS such that the symbols used for DMRS may not overlap with switching symbols associated with the transition from half-duplex to full-duplex. Additionally or alternatively, the base station 105 may select a DMRS pattern based on an envisioned mode of operation (e.g., the base station may be aware of the location of the half-duplex to full-duplex transition, and places the DMRS in locations that avoid the overlap location).

In some examples, the base station 105 may determine locations for downlink DMRS symbols that occur before and after the overlapping region to enable the ongoing downlink reception at the UE 115 without loss of phase continuity and with minimal symbol puncturing and phase discontinuity (e.g., zero or below a threshold amount). Additionally or alternatively, and to support of the transition from half-duplex to full-duplex, the base station 105 may also determine uplink DMRS symbols occurring before and after the overlapping region of duplexing modes to enable uplink transmissions (e.g., when in full-duplex mode) without symbol puncturing or the loss of phase continuity. Based on the determined DMRS placement configuration and scheduling at the base station 105, the base station 105 may transmit the transition configuration 210 (e.g., DMRS placement configuration) to the UE 115. In some instances, the transmission configuration 210 may indicate a number of symbols affected by the transition from half-duplex to full-duplex operations (e.g., symbols used by the UE 115 to transition from half-duplex to full-duplex).

In another example, the UE 115 may provide assisting information (e.g., UE assistance information via an associated information element) to the base station 105 to configure a DMRS pattern. In such cases, the UE 115 may determine a number of symbols that are affected by the transition from half-duplex to full-duplex, and may request a number of symbols for DMRS or a DMRS pattern that avoids the overlap. In some cases, the UE 115 may request a different DMRS configuration than the one that is currently configured by the base station 105. Additionally or alternatively, the UE 115 may indicate a number of DMRS symbols, a location of DMRS symbols, or both, to the base station 105 to assist the base station 105 in determining a DMRS placement configuration. Additionally or alternatively, the UE 115 may indicate the number of symbols scheduled for switching in an upcoming communication, a location of symbols scheduled for switching in the upcoming communication, or both, to the base station 105.

In some examples, the base station 105 may transmit the transition configuration 210 to the UE 115 via control signaling such as a medium access control-control element (MAC-CE), a downlink control information (DCI), a radio resource control (RRC) message, or any combination thereof. In some instances, the base station 105 may use the control signaling to dynamically (e.g., using the DCI or MAC-CE) or semi-statically (using the MAC-CE or RRC) indicate one or more symbols that may be used for transitioning, puncturing, or both, to the UE 115. For example, the base station 105 may indicate symbols where no signal may be transmitted within the indicated symbols (e.g., gap symbols), and may determine that the gap symbols may be used for transitioning or puncturing.

In some cases, the switching indication may be based on preconfigured rules corresponding to the switching symbols and the coding block related configurations. The rules may be defined based on slot formats (e.g., from "D" to "BD" leave X symbols as gap symbols). For example, in some cases, the transition configuration 210 transmitted by the base station 105 may include a cancellation configuration. The cancellation configuration may cancel one or more overlapping symbols associated with the half-duplex operations and the full-duplex operations. In some cases, the indication of cancellation may be multiplexed with the half-duplex operations, the full-duplex operations, or both. Based on the cancellation indication transmitted from the base station 105, the UE 115 may cancel operations over the indicated switching symbols. Additionally or alternatively, the UE 115 may switch the half-duplex operation and the full-duplex operation from a first transport block to a second transport block in accordance with the cancellation configuration.

In some other examples, the UE 115 may communicate with multiple devices (e.g., one or more parent devices such as base stations or UEs), where the UE 115 may initially perform half-duplex communications with the base station 105 and subsequently transition to full-duplex operations to communicate simultaneously with one or more other devices. For example, the UE 115 may perform uplink communications with a second wireless device in addition to performing downlink communications with the base station 105 after switching to full-duplex mode. The second wireless device may correspond to any multitude of devices, including integrated access backhaul (IAB) nodes, parents of distributed units (DUs), when a UE is dual connected in the same band or carrier, or performing full-duplex communications with two parent nodes.

Additionally or alternatively, the techniques described herein may correspond to a number of different multi-unit arrangements (e.g., IAB mobile termination (MT) indicating information to parent distributed units for overlapping communications over parent-links and child-links), when the UE 115 is dual connected in the same band or carrier and performing full-duplex communications with two parents. The techniques may also be applied to sidelink communications, where a UE is performing full-duplex with two other UEs, or with one UE and a base station via fill-duplex sidelink and a Universal Mobile Telecommunications System Terrestrial Radio Access Network and UE (Uu) link. The UE 115 may perform switching from half-duplex to full-duplex operations over one or a few symbols (e.g., switching symbols) corresponding to an overlap between half-duplex operations and full-duplex operations.

In such cases, the base station 105, the UE 115, the second wireless device, or some combination thereof may receive a multi-connection configuration (e.g., configuration 210) to accommodate the switching symbols without loss of phase continuity while minimizing symbol puncturing. For example, the UE 115 may receive the multi-connection configuration from one or both of the second wireless device and the base station 105, where the multi-connection configuration includes a DMRS placement pattern based on the overlapping symbols. In some cases, the multi-connection configuration may be supported by assistance information provided by the UE 115, the second wireless device, or both, corresponding to requested locations for transmitting DMRS based on the overlapping symbols.

In some cases, UE 115 (e.g., a UE/MT) may be connected to two parents (e.g., base station 105 and at least one other parent node), where the UE 115 may receive downlink communications from one parent node and transmit uplink communications to the other parent node. In some examples, there may be prior coordination between the parent-nodes in which the parent nodes may coordinate a configuration for DMRS patterns, switching symbols, or both. In some examples, the UE 115 may also perform prior coordination with the parent-nodes. For example, the UE 115 may request a DMRS pattern or a number of switching symbols, which the parent-nodes may utilize when determining the DMRS pattern and switching symbols. In some other examples, there may be no prior coordination, and the reception at the UE 115 may be unsuccessful. In such cases, the UE 115 may request a retransmission of the full-duplex communications.

In some other examples, prior coordination (e.g., requesting DMRS from the base station 105 and providing transition configuration 210) may not be feasible, and the reception of one or more communications at the UE 115 was unsuccessful based on a transition between communication modes at the UE 115. In such cases, the wireless communications system 200 may support enhanced acknowledgement (ACK)/negative acknowledgement (NACK) to indicate the unsuccessful communications (e.g., indicating the punctured or dropped symbols). For example, a single-bit or multi-bit NACK may be utilized to indicate which symbols may not have been received. Additionally or alternatively, instructions for how to utilize (e.g., interpret) and configure the multi-bit NACK (e.g., how to interpret bits) may be communicated via an RRC configuration, prior negotiations between devices (e.g., between the UE 115 and parents in the case of multiple connections), or both. In some cases, a receiver (e.g., the UE 115) may indicate, to the base station 105, to repeat the full-duplex portions of the communications.

In some other cases, for example, the UE 115 may transition from half-duplex to full-duplex communications and may at a later time indicate which symbols were canceled (e.g., after puncturing has occurred). In some examples, the indication may be in-band (e.g., multiplexed with the same transmission on the last symbols). Additionally or alternatively, the UE 115 may change to a different transport block within allocated resources to avoid overlap and to support the transition between half and full-duplex modes.

Figure 3:
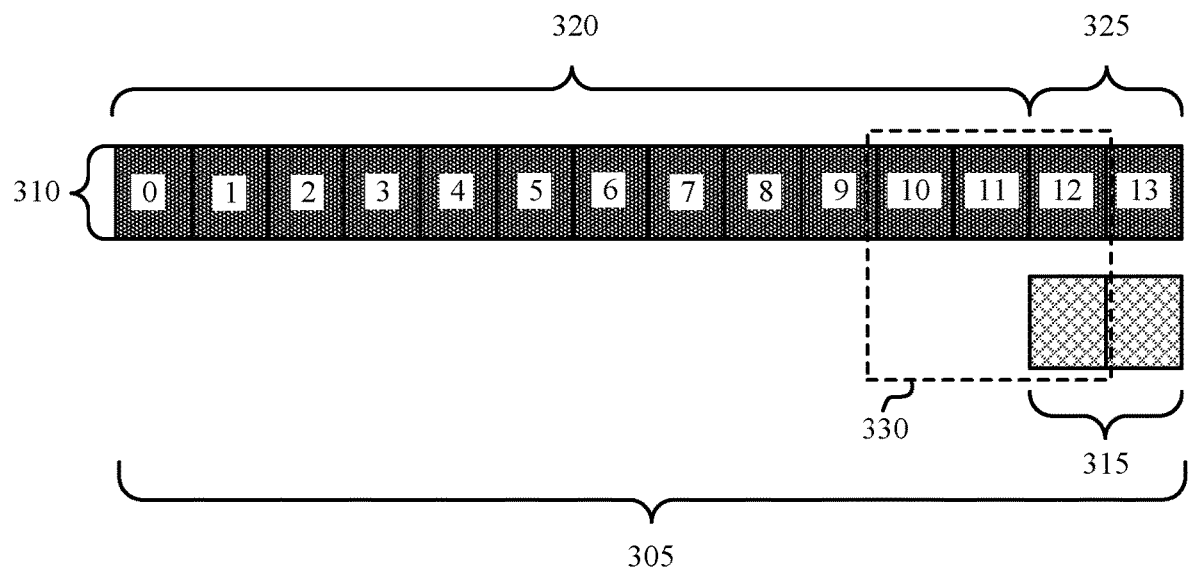
FIG. 3 illustrates an example of a communications overlap that supports techniques for managing partially overlapping transmission and reception in accordance with aspects of the present disclosure.

FIG. 3 illustrates an example of a communications overlap 300 that supports techniques for managing partially overlapping transmission and reception in accordance with aspects of the present disclosure. The communications overlap 300 may be associated with full-duplex and half-duplex communications between a UE and a base station, which may be examples of corresponding devices discussed with reference to FIGS. 1 and 2. In some examples, the communications overlap 300 may be associated with one or more operations, procedures, and techniques associated with the base station and the UE, which may be examples of those discussed with reference to FIGS. 1 and 2.

As discussed herein, a wireless communications system may utilize one or more signaling operations to adapt to situations where a wireless device transitions from one duplex mode (e.g., a half-duplex mode or a full-duplex mode) to another duplex mode (e.g., a half-duplex mode or a full-duplex mode) within a communications slot or scheduled communications duration. For example, a UE that is capable of supporting both half-duplex and full-duplex communications may receive downlink communications within slot 305 from a base station that is also capable of supporting both half-duplex and full-duplex communications. In the examples described with reference to FIG. 3, a wireless device (e.g., the UE) may perform half-duplex operations within the slot 305 such that the UE receives downlink information 310 from the base station in symbols 0-13 (e.g., the full slot), and performs uplink transmissions 315 at symbols 12 and 13 at the end of the slot 305.

In some cases, the slot 305 may illustrate a scenario where symbols 0-11 are utilized as part of a half-duplex operation 320 at the UE. Similarly, the slot 305 illustrates a scenario where the UE initiates uplink transmissions 315 simultaneously with the reception of downlink information 310, corresponding to a full-duplex operation 325. In some examples, the scenario may be reversed (e.g., full-duplex operation may transition to half-duplex operation) utilizing techniques described in the present disclosure.

To avoid loss of phase continuity and to minimize symbol puncturing based on the transition between half-duplex communications 320 and full-duplex communications 325, the UE may receive, from the base station, a configuration indicating a second set of locations for transmitting DMRS. In some cases, the configuration may indicate a placement of DMRS which avoids switching symbols 330 (e.g., symbols 10-12, although other switching symbols are possible) so that puncturing or loss of DMRS may be avoided. Such placement of DMRS that avoids the switching symbols 330 may increase reliability and ensure accurate channel estimation.

In some cases, the UE may transmit assistance information to notify the base station of a requested first set of locations for the DMRS. In some instances, the base station may indicate a new set of DMRS locations in response to the requested first set of locations. In some examples, the assistance information may indicate a requested number of symbols for transmitting DMRS, a requested location of symbols for transmitting the DMRS, a number of symbols associated with the transition from the first duplexing mode to the second duplexing mode, or any combination thereof. For example, the full-duplex operation 325 may correspond to the transition from half-duplex to full-duplex operations. In some cases, the UE may refrain from communicating with the base station during the number of symbols affected by the transition (e.g., switching symbols 330) in accordance with a transition duration configuration. In some examples, the transition duration configuration may be based on respective slot formats (e.g., uplink slot configurations, downlink slot configurations, flexible slot configurations, full-duplex slot configurations, etc.) associated with the switching symbols 330.

In some cases, as discussed above, one or more symbols may not be received by the UE (e.g., if prior coordination is not possible). In such cases, a feedback configuration may be utilized by the UE and the base station to determine communications that may have been unsuccessfully received by the UE, the base station, or both, over one or more overlapping symbols (e.g., full-duplex operation 325). Based on determining unsuccessful communications, the UE may transmit a feedback transmission indicating an unsuccessful receipt to the base station. As discussed above with reference to FIG. 2, the feedback transmission may correspond to a multi-bit feedback transmission, or a single bit-feedback transmission. In some cases, for example, the UE may request for the base station to retransmit the half-duplex operation 320, the full-duplex operation 325, or both. In some cases, the base station may transmit a feedback transmission to the UE (e.g., via RRC signaling).

Figure 4:
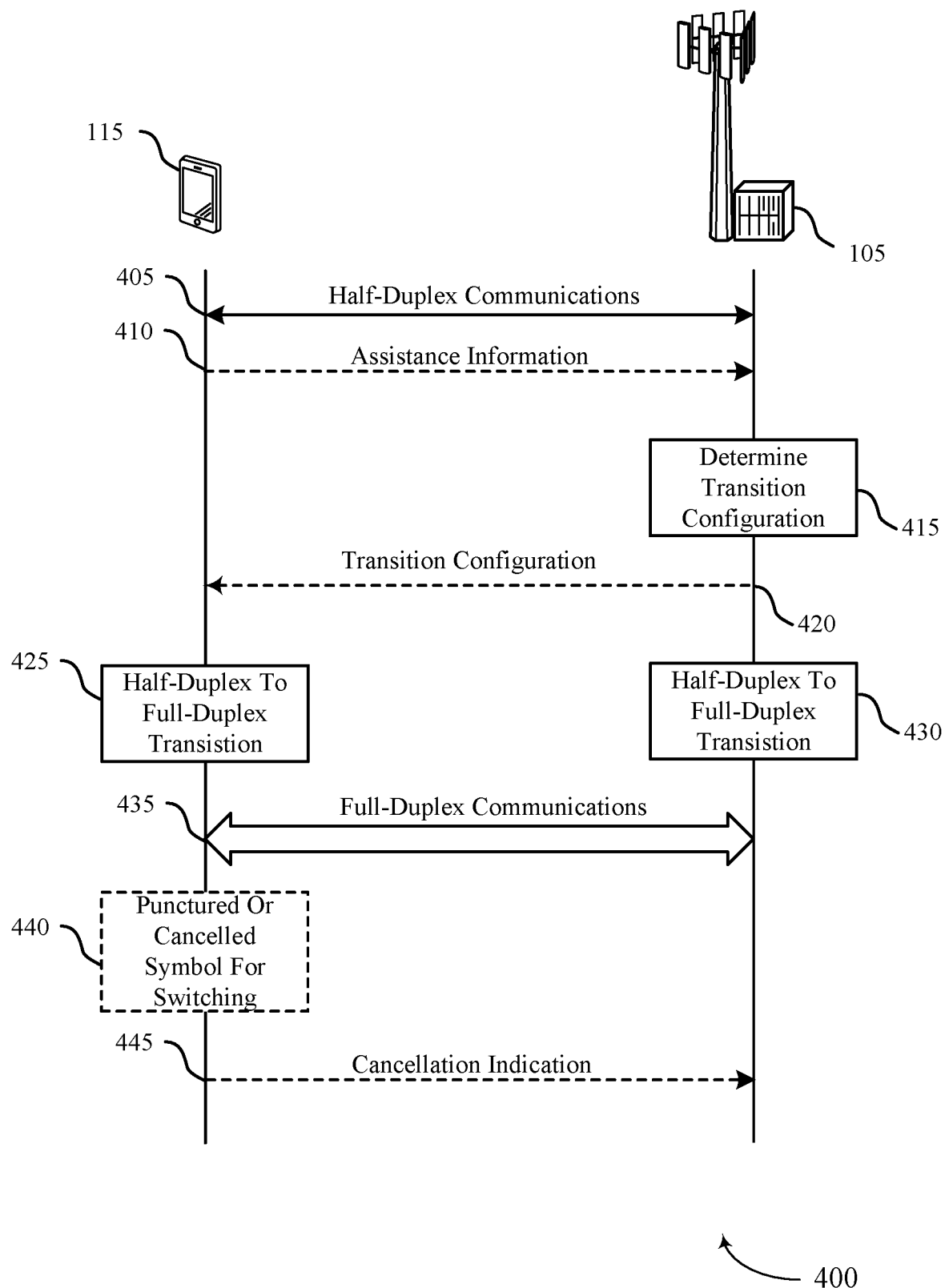
FIG. 4 illustrates an example of a process flow that supports techniques for managing partially overlapping transmission and reception in accordance with aspects of the present disclosure.

FIG. 4 illustrates an example of a process flow 400 that supports techniques for managing partially overlapping transmission and reception in accordance with aspects of the present disclosure. The process flow 400 may include references to a UE 115 and a base station 105, which may be examples of corresponding base station 105 and UE 115 as discussed with reference to FIGS. 1 and 2. In some examples, the process flow 400 may include one or more operations, procedures, and signaling associated with the base station 105 and the UE 115, which may be examples of those discussed with reference to FIGS. 1 through 3. It should be understood that, while an example order of operations and signaling is illustrated by FIG. 4, any multitude of devices may perform steps discussed below. Additionally, steps within the process flow 400 may be rearranged, added to, or subtracted to, while accomplishing management of partially overlapping transmissions and receptions as described in the present disclosure.

At 405, the UE 115 may perform half-duplex communications with the base station 105 for a full duration of a slot. For example, the UE 115 may receive downlink communications from the base station 105, or the UE 115 may transmit uplink communications to the base station 105. In some cases, such as those described herein, with reference to FIGS. 1 through 3, the UE 115 may transition from a first duplexing mode (e.g., performing half-duplex communications) to a second duplexing mode (e.g., performing full-duplex operations) at some time during the ongoing communications of the first duplexing mode, for example, at the end of the slot. In such cases, the UE 115 may determine that the communications associated with the first duplexing mode at least partially overlap in time with communications associated with the second duplexing mode. For example, the UE 115 may initially receive a downlink transmission from the base station 105 over symbols 0-13 (e.g., 0-11 may correspond to half-duplex operations), and determine to switch to performing uplink transmissions simultaneously while receiving the downlink transmissions over symbols 12-13 (e.g., full-duplex operations).

Optionally, at 410, the UE 115 may transmit assistance information to the base station 105. As discussed herein, the assistance information may correspond to requested locations and symbols for DMRS corresponding to the communication slot, and based on the determined overlap of communications. For example, the assistance information may include a requested number of symbols for transmitting the DMRS, a requested location of symbols for transmitting the DMRS, a number of symbols associated with the transition from the first duplexing mode to the second duplexing mode, or any combination thereof.

At 415, based on the half-duplex communications 405, and optionally based on the assistance information at 410, the base station 105 may determine a transition configuration for coordinating the communications associated with respective communication modes. In some examples, the transition information may include a DMRS placement configuration that indicates a placement of DMRS before and after symbols affected by the transition between duplexing modes at the UE 115. In such cases, the base station 105 may determine DMRS scheduling and locations such that the UE 115 may perform a transition from half-duplex to full-duplex operations (or vice-versa) without the loss of phase continuity and while minimizing symbol puncturing.

In some examples, the transition configuration may indicate a number of symbols impacted by the overlap, and the UE 115 may refrain from communicating with the base station 105 during the affected symbols, or the UE 115 may pause communications before the affected symbols and resume communications after the affected symbols.

At 420, the base station 105 may transmit the transition configuration to the UE 115 based on the determination of the transition configuration at 415. In some examples, the base station may transmit the transition configuration using control signaling such as RRC signaling, MAC-CE signaling, DCI, RRC signaling, or any combination thereof. The base station 105 may be further configured to dynamically update the transition configuration using the control signaling.

In some examples, the transition configuration may further include a configuration for the UE to transmit feedback based on the transition between communication modes. For example, the transition configuration may include a feedback configuration which the UE 115 may utilize to indicate that one or more communications were unsuccessfully received due to the transition between communication modes. The UE 115 may then transmit a multi-bit feedback message indicating the communications that were unsuccessfully received.

At 425, the UE 115 may perform a half-duplex to full-duplex transition based on the transition configuration at 420. Similarly, at 430, the base station 105 may optionally perform a half-duplex to full-duplex transition. In some other cases, such as when the UE 115 may be performing uplink communications with a second wireless device and receive downlink communications from a third device, one or more devices may not transition to full-duplex operations.

Based on the transition, the UE 115 and the base station 105 may perform full-duplex communications at 435 using overlapping symbols corresponding to the ongoing half-duplex communications and the full-duplex communications at the end of the communication slot.

In some cases, at 440, the UE 115 may determine that a communication experienced a puncture or canceled symbol during switching. For example, the UE 115 may preemptively cancel one or more symbols associated with the transition. In such cases, the UE 115 may transmit a cancellation indication (e.g., a feedback message) at 445 to the base station 105. In some cases, the cancellation indication may include a request for the base station 105 to retransmit the communications corresponding to the half-duplex communications, the full-duplex communications, or both.

Figure 5:
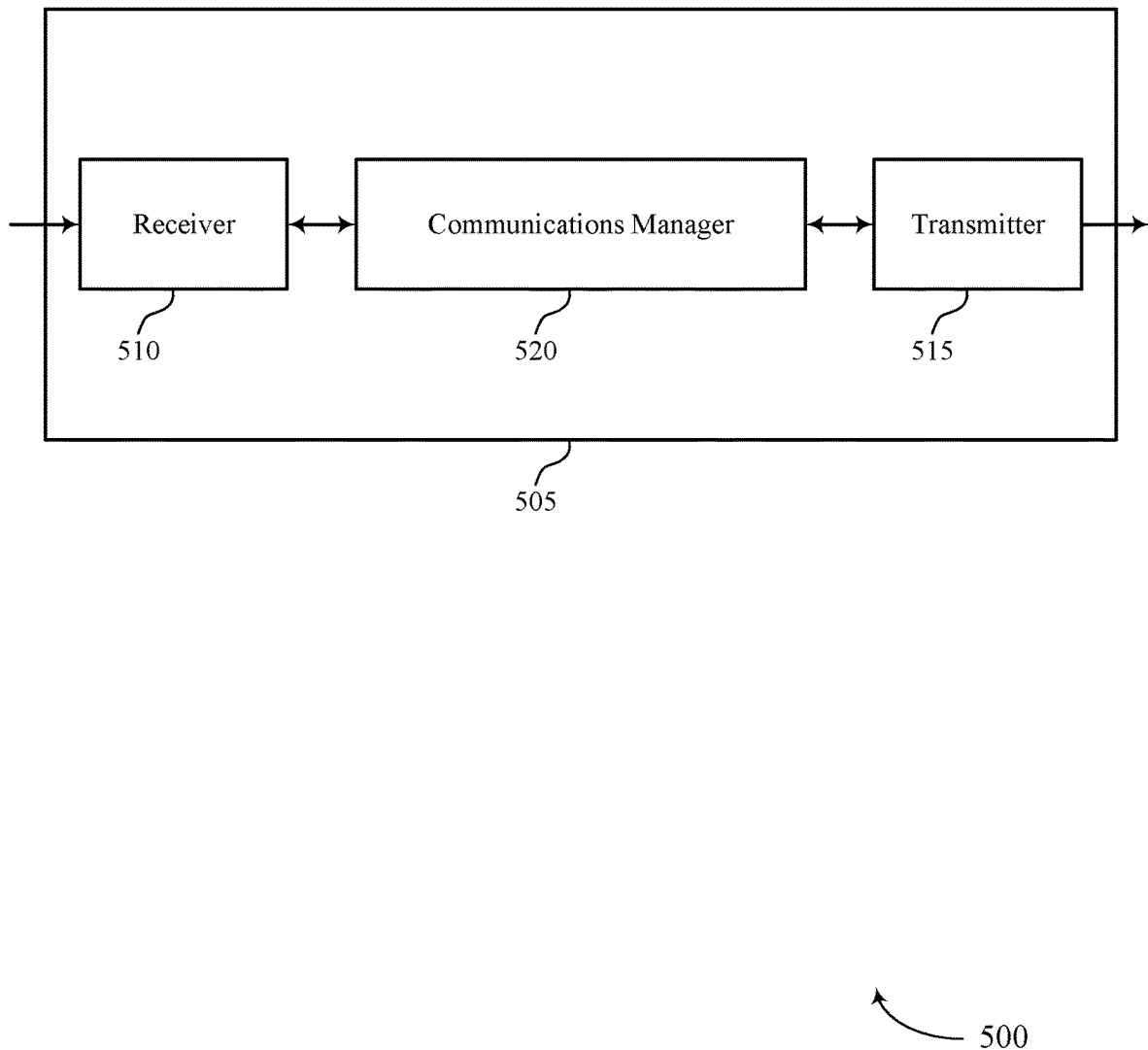
FIGS. 5 and 6 show block diagrams of devices that support techniques for managing partially overlapping transmission and reception in accordance with aspects of the present disclosure.

FIG. 5 shows a block diagram 500 of a device 505 that supports techniques for managing partially overlapping transmission and reception in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for managing partially overlapping transmission and reception). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for managing partially overlapping transmission and reception). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of techniques for managing partially overlapping transmission and reception as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first wireless device in accordance with examples as disclosed herein. For example, the communications manager 520 may be configured as or otherwise support a means for transitioning from a first duplexing mode to a second duplexing mode of the first wireless device, where a first communication associated with the first duplexing mode at least partially overlaps in time with a second communication associated with the second duplexing mode. The communications manager 520 may be configured as or otherwise support a means for identifying transition information for coordinating the first communication associated with the first duplexing mode and the second communication associated with the second duplexing mode based on the overlap. The communications manager 520 may be configured as or otherwise support a means for transitioning from the first duplexing mode to the second duplexing mode in accordance with the transition information. The communications manager 520 may be configured as or otherwise support a means for communicating with a second wireless device using the second duplexing mode.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, more efficient utilization of communication resources, and more accurate channel estimation.

Figure 6:
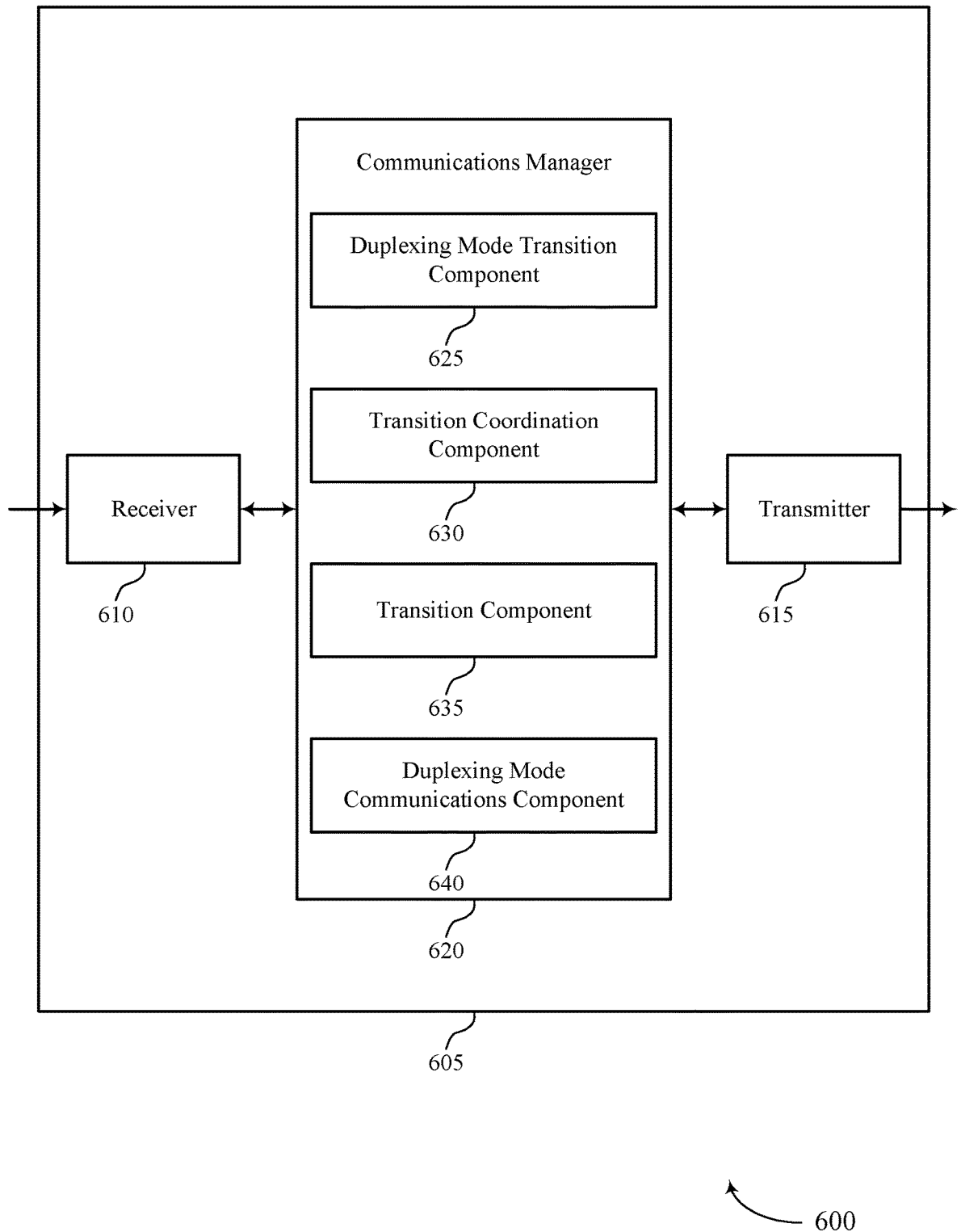

FIG. 6 shows a block diagram 600 of a device 605 that supports techniques for managing partially overlapping transmission and reception in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for managing partially overlapping transmission and reception). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for managing partially overlapping transmission and reception). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of techniques for managing partially overlapping transmission and reception as described herein. For example, the communications manager 620 may include a duplexing mode transition component 625, a transition coordination component 630, a transition component 635, a duplexing mode communications component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first wireless device in accordance with examples as disclosed herein. The duplexing mode transition component 625 may be configured as or otherwise support a means for transitioning from a first duplexing mode to a second duplexing mode of the first wireless device, where a first communication associated with the first duplexing mode at least partially overlaps in time with a second communication associated with the second duplexing mode. The transition coordination component 630 may be configured as or otherwise support a means for identifying transition information for coordinating the first communication associated with the first duplexing mode and the second communication associated with the second duplexing mode based on the overlap. The transition component 635 may be configured as or otherwise support a means for transitioning from the first duplexing mode to the second duplexing mode in accordance with the transition information. The duplexing mode communications component 640 may be configured as or otherwise support a means for communicating with a second wireless device using the second duplexing mode.

Figure 7:
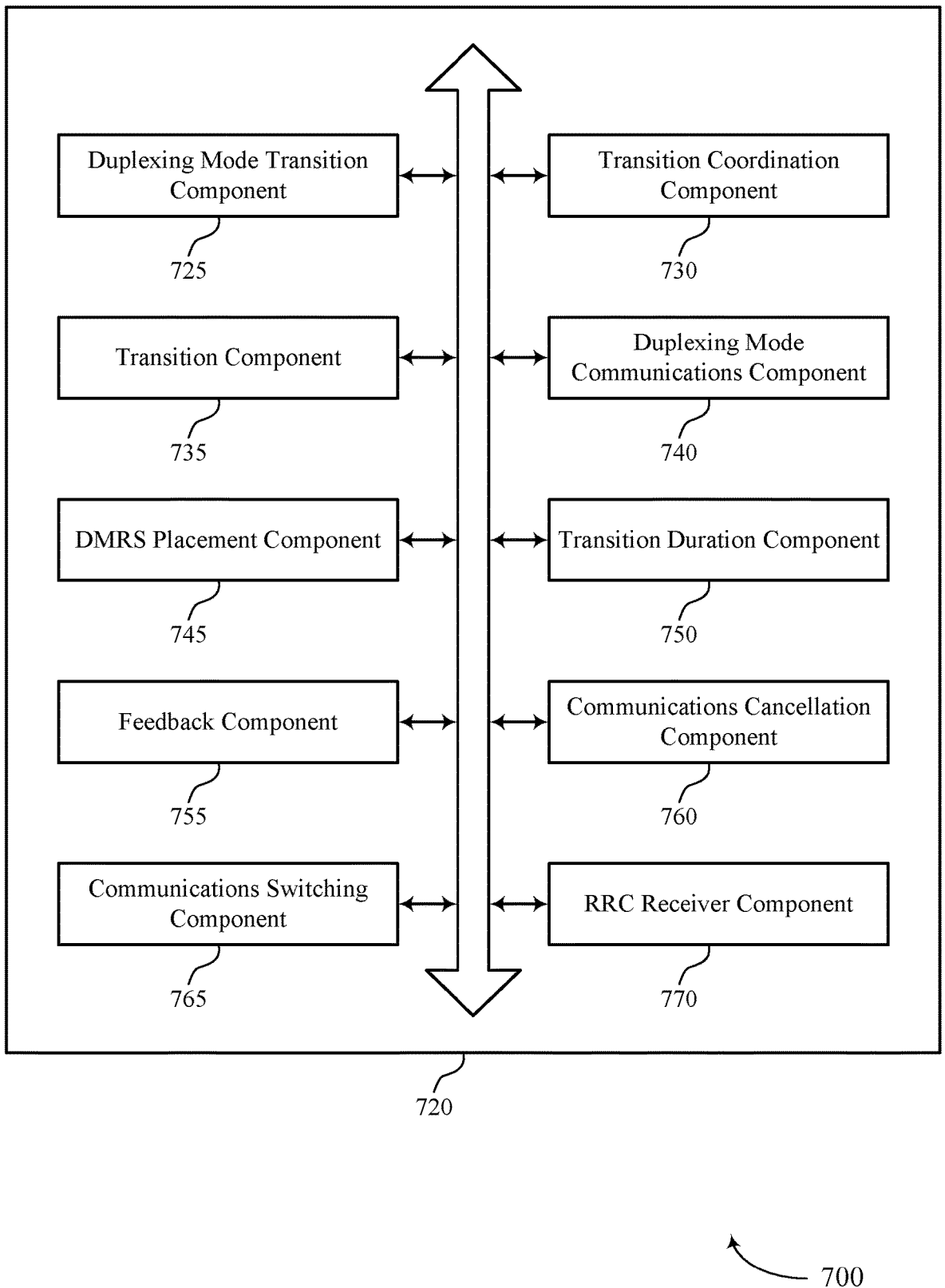
FIG. 7 shows a block diagram of a communications manager that supports techniques for managing partially overlapping transmission and reception in accordance with aspects of the present disclosure.

FIG. 7 shows a block diagram 700 of a communications manager 720 that supports techniques for managing partially overlapping transmission and reception in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for managing partially overlapping transmission and reception as described herein. For example, the communications manager 720 may include a duplexing mode transition component 725, a transition coordination component 730, a transition component 735, a duplexing mode communications component 740, a DMRS placement component 745, a transition duration component 750, a feedback component 755, a communications cancellation component 760, a communications switching component 765, an RRC receiver component 770, or any combination thereof. Each of these components may communicate, directly or indirectly, with one another (e.g., via one or more buses).

The communications manager 720 may support wireless communications at a first wireless device in accordance with examples as disclosed herein. The duplexing mode transition component 725 may be configured as or otherwise support a means for transitioning from a first duplexing mode to a second duplexing mode of the first wireless device, where a first communication associated with the first duplexing mode at least partially overlaps in time with a second communication associated with the second duplexing mode. The transition coordination component 730 may be configured as or otherwise support a means for identifying transition information for coordinating the first communication associated with the first duplexing mode and the second communication associated with the second duplexing mode based on the overlap. The transition component 735 may be configured as or otherwise support a means for transitioning from the first duplexing mode to the second duplexing mode in accordance with the transition information. The duplexing mode communications component 740 may be configured as or otherwise support a means for communicating with a second wireless device using the second duplexing mode.

In some examples, the transition information includes a DMRS placement configuration, and the DMRS placement component 745 may be configured as or otherwise support a means for receiving the DMRS placement configuration from the second wireless device. In some examples, the transition information includes a DMRS placement configuration, and the DMRS placement component 745 may be configured as or otherwise support a means for transmitting uplink DMRS in symbols occurring before and after the overlap in accordance with the DMRS placement configuration.

In some examples, the transition information includes a DMRS placement configuration, and the DMRS placement component 745 may be configured as or otherwise support a means for receiving, from the second wireless device, downlink DMRS in symbols occurring before and after the overlap in accordance with the DMRS placement configuration.

In some examples, the transition information includes a DMRS placement configuration, and the DMRS placement component 745 may be configured as or otherwise support a means for transmitting, to the second wireless device, assistance information including a first set of locations for transmitting DMRS requested by the first wireless device based on the overlap.

In some examples, the DMRS placement component 745 may be configured as or otherwise support a means for receiving, from the second wireless device, a configuration indicating a second set of locations for transmitting DMRS, where the second set of locations is different from the first set of locations. In some examples, the DMRS placement component 745 may be configured as or otherwise support a means for transmitting the assistance information to notify the second wireless device of the requested first set of locations.

In some examples, the assistance information indicates a requested number of symbols for transmitting the DMRS, a requested location of symbols for transmitting the DMRS, a number of symbols associated with the transition from the first duplexing mode to the second duplexing mode, or any combination thereof.

In some examples, the transition information includes a transition duration configuration, and the transition duration component 750 may be configured as or otherwise support a means for receiving the transition duration configuration from the second wireless device, where the transition duration configuration indicates a number of symbols affected by the transition from the first duplexing mode to the second duplexing mode.

In some examples, the transition duration component 750 may be configured as or otherwise support a means for refraining from communicating with the second wireless device during the number of symbols affected by the transition in accordance with the transition duration configuration.

In some examples, the transition duration component 750 may be configured as or otherwise support a means for receiving the transition duration configuration via a medium access control-control element (MAC-CE), a DCI, RRC message, or any combination thereof.

In some examples, the transition duration configuration is based on respective slot formats associated with one or more slots associated with the transition.

In some examples, the transition information includes a feedback configuration, and the feedback component 755 may be configured as or otherwise support a means for determining that the first communication and the second communication are unsuccessfully received by the first wireless device over one or more overlapping symbols. In some examples, the transition information includes a feedback configuration, and the feedback component 755 may be configured as or otherwise support a means for transmitting a feedback transmission indicating the unsuccessful receipt in accordance with the feedback configuration.

In some examples, the feedback transmission includes a multi-bit feedback transmission.

In some examples, the RRC receiver component 770 may be configured as or otherwise support a means for receiving the feedback configuration from the second wireless device via radio resource control signaling.

In some examples, the feedback transmission includes a request for the second wireless device to retransmit the first communication associated with the first duplexing mode, the second communication associated with the second duplexing mode, or both.

In some examples, the transition information includes a cancellation configuration, and the communications cancellation component 760 may be configured as or otherwise support a means for cancelling one or more overlapping symbols associated the first communication and the second communication. In some examples, the transition information includes a cancellation configuration, and the communications cancellation component 760 may be configured as or otherwise support a means for transmitting, to the second wireless device, an indication of the cancellation in accordance with the cancellation configuration.

In some examples, the indication of the cancellation is multiplexed with the first communication, the second communication, or both.

In some examples, the communications switching component 765 may be configured as or otherwise support a means for switching the first communication and the second communication from a first transport block to a second transport block in accordance with the cancellation configuration.

In some examples, the transition information includes a multi-connection configuration, and the DMRS placement component 745 may be configured as or otherwise support a means for receiving the multi-connection configuration from the second wireless device, a third wireless device, or both, where the multi-connection configuration includes a DMRS placement pattern based on the overlap. In some examples, the transition information includes a multi-connection configuration, and the communications switching component 765 may be configured as or otherwise support a means for communicating with the second wireless device and the third wireless device in accordance with the multi-connection configuration.

In some examples, the DMRS placement component 745 may be configured as or otherwise support a means for transmitting, to the second wireless device, the third wireless device, or both, assistance information including a first set of requested locations for transmitting DMRS based on the overlap.

In some examples, the first duplexing mode and the second duplexing mode include either a half-duplexing mode or a full-duplexing mode.

Figure 8:
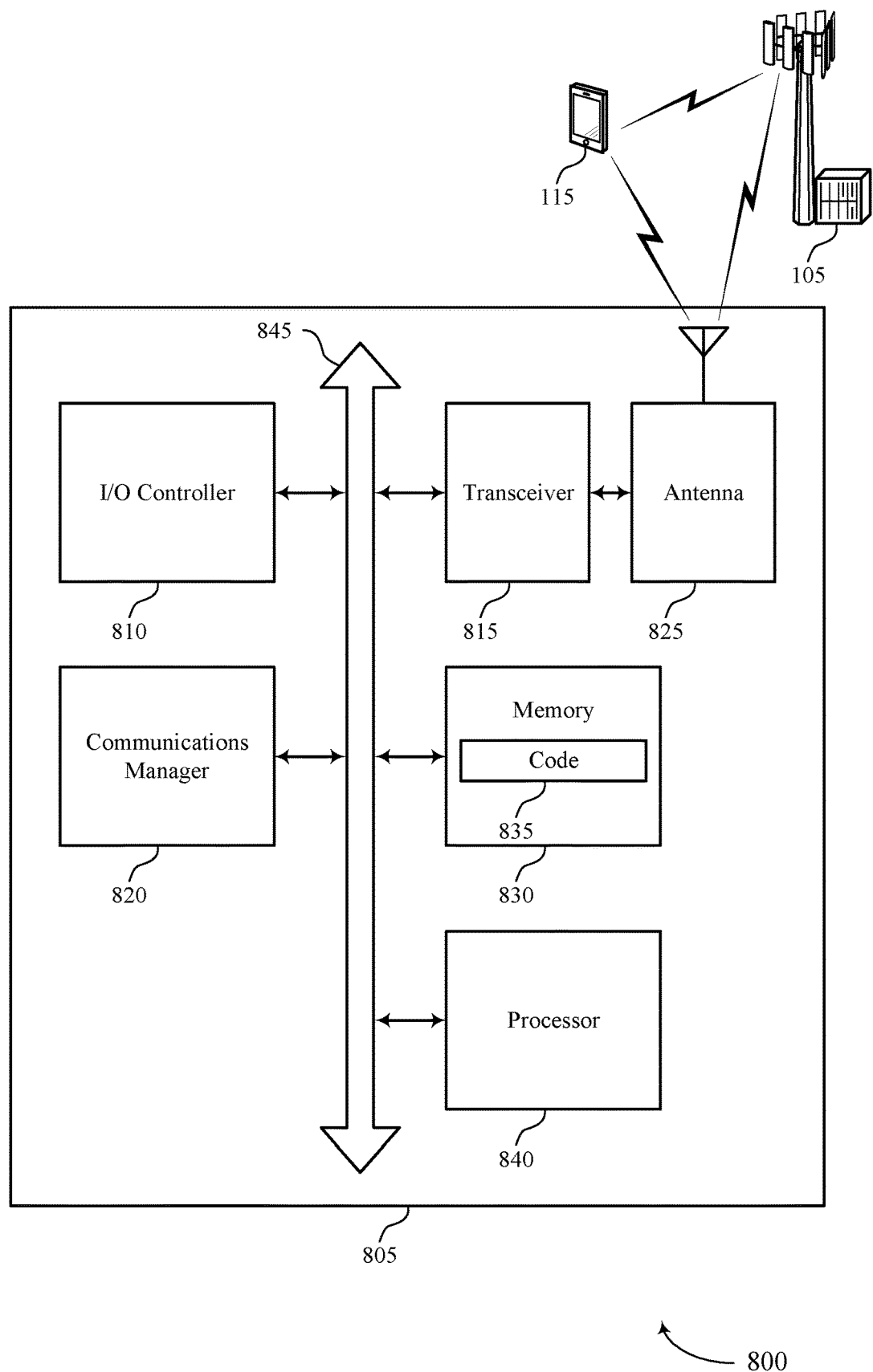
FIG. 8 shows a diagram of a system including a device that supports techniques for managing partially overlapping transmission and reception in accordance with aspects of the present disclosure.

FIG. 8 shows a diagram of a system 800 including a device 805 that supports techniques for managing partially overlapping transmission and reception in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for managing partially overlapping transmission and reception). For example, the device 805 or a component of the device 805 may include a processor 840 and memory 830 coupled to the processor 840, the processor 840 and memory 830 configured to perform various functions described herein.

The communications manager 820 may support wireless communications at a first wireless device in accordance with examples as disclosed herein. For example, the communications manager 820 may be configured as or otherwise support a means for transitioning from a first duplexing mode to a second duplexing mode of the first wireless device, where a first communication associated with the first duplexing mode at least partially overlaps in time with a second communication associated with the second duplexing mode. The communications manager 820 may be configured as or otherwise support a means for identifying transition information for coordinating the first communication associated with the first duplexing mode and the second communication associated with the second duplexing mode based on the overlap. The communications manager 820 may be configured as or otherwise support a means for transitioning from the first duplexing mode to the second duplexing mode in accordance with the transition information. The communications manager 820 may be configured as or otherwise support a means for communicating with a second wireless device using the second duplexing mode.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, improved channel estimation, higher throughput, and increased signaling efficiency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for managing partially overlapping transmission and reception as described herein, or the processor 840 and the memory 830 may be otherwise configured to perform or support such operations.

Figure 9:
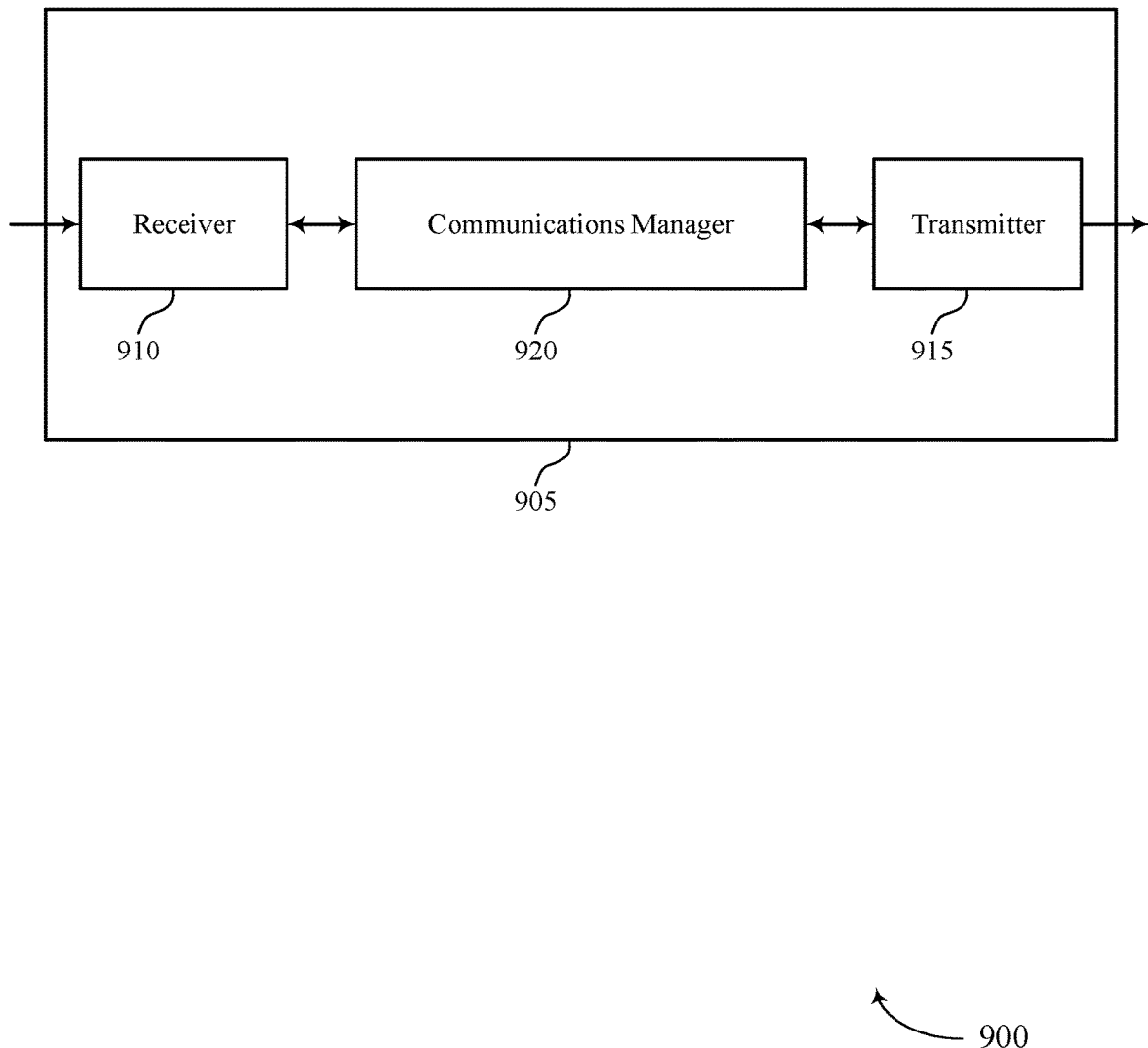
FIGS. 9 and 10 show block diagrams of devices that support techniques for managing partially overlapping transmission and reception in accordance with aspects of the present disclosure.

FIG. 9 shows a block diagram 900 of a device 905 that supports techniques for managing partially overlapping transmission and reception in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for managing partially overlapping transmission and reception). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for managing partially overlapping transmission and reception). In some examples, the transmitter 915 may be co-located with a receiver 910 in a transceiver. The transmitter 915 may utilize a single antenna or a set of multiple antennas.

The communications manager 920, the receiver 910, the transmitter 915, or various combinations thereof or various components thereof may be examples of means for performing various aspects of techniques for managing partially overlapping transmission and reception as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a second wireless device in accordance with examples as disclosed herein. For example, the communications manager 920 may be configured as or otherwise support a means for transmitting, to a first wireless device, transition information for coordinating an overlap of a first communication associated with a first duplexing mode and a second communication associated with a second duplexing mode, where the first wireless device is to transition from the first duplexing mode to the second duplexing mode during the overlap. The communications manager 920 may be configured as or otherwise support a means for communicating with the first wireless device in accordance with the transition information.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, more efficient utilization of communication resources, and more accurate channel estimation.

Figure 10:
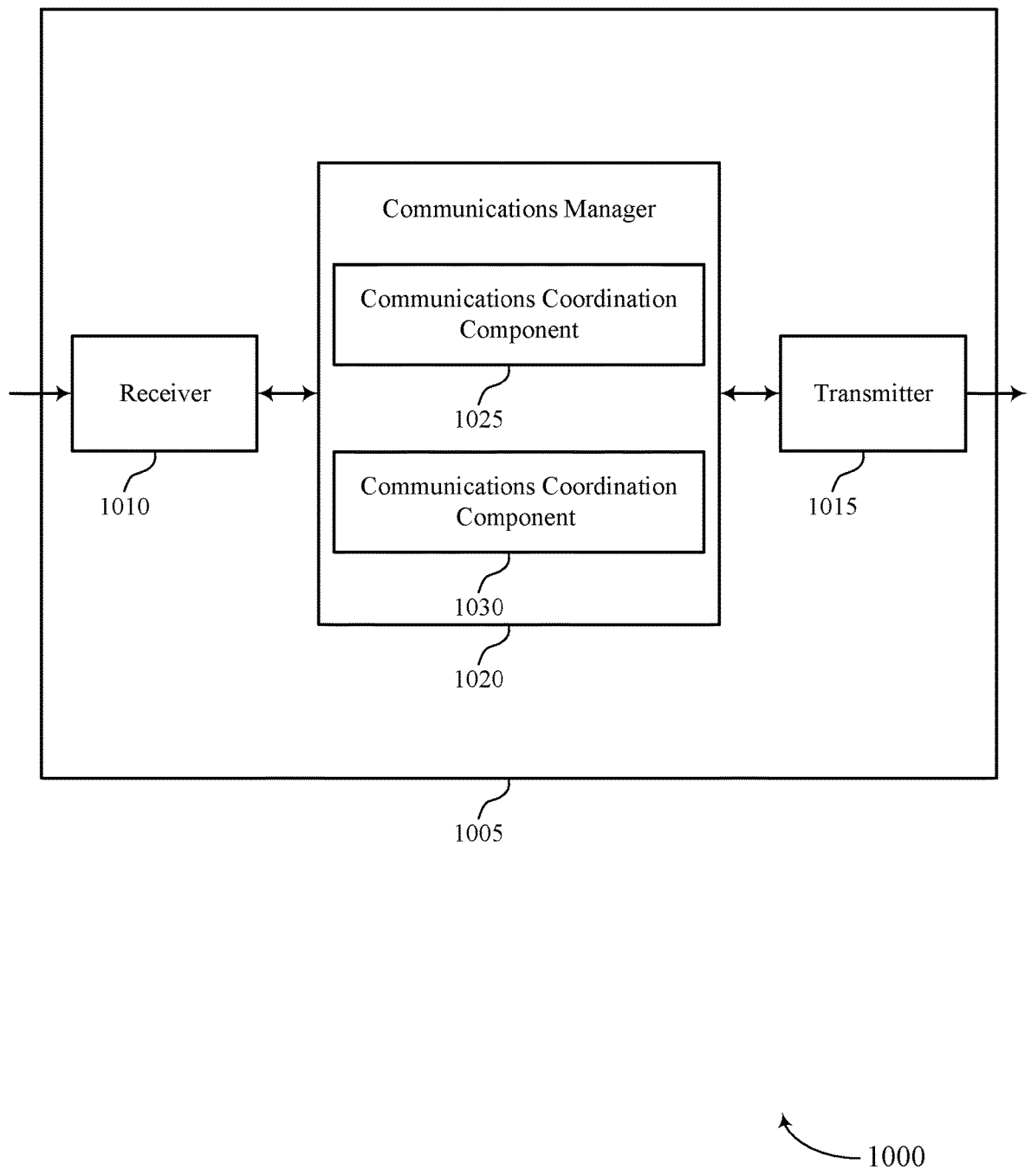

FIG. 10 shows a block diagram 1000 of a device 1005 that supports techniques for managing partially overlapping transmission and reception in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for managing partially overlapping transmission and reception). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for managing partially overlapping transmission and reception). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for managing partially overlapping transmission and reception as described herein. For example, the communications manager 1020 may include a communications coordination component 1025 a communications coordination component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a second wireless device in accordance with examples as disclosed herein. The communications coordination component 1025 may be configured as or otherwise support a means for transmitting, to a first wireless device, transition information for coordinating an overlap of a first communication associated with a first duplexing mode and a second communication associated with a second duplexing mode, where the first wireless device is to transition from the first duplexing mode to the second duplexing mode during the overlap. The communications coordination component 1030 may be configured as or otherwise support a means for communicating with the first wireless device in accordance with the transition information.

Figure 11:
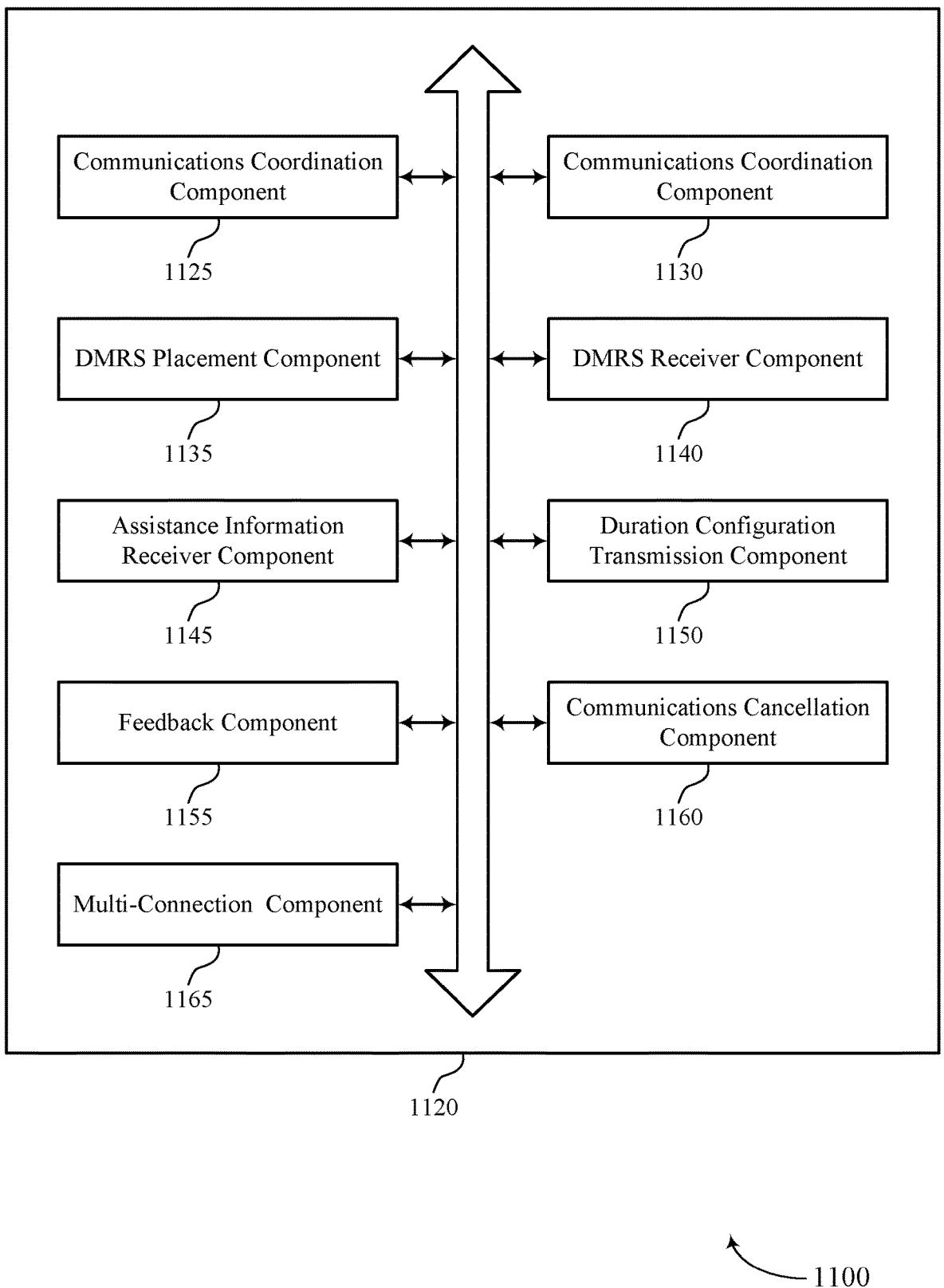
FIG. 11 shows a block diagram of a communications manager that supports techniques for managing partially overlapping transmission and reception in accordance with aspects of the present disclosure.

FIG. 11 shows a block diagram 1100 of a communications manager 1120 that supports techniques for managing partially overlapping transmission and reception in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for managing partially overlapping transmission and reception as described herein. For example, the communications manager 1120 may include a communications coordination component 1125, a communications coordination component 1130, a DMRS placement component 1135, a DMRS receiver component 1140, an assistance information receiver component 1145, a duration configuration transmission component 1150, a feedback component 1155, a communications cancellation component 1160, a multi-connection component 1165, or any combination thereof. Each of these components may communicate, directly or indirectly, with one another (e.g., via one or more buses).

The communications manager 1120 may support wireless communications at a second wireless device in accordance with examples as disclosed herein. The communications coordination component 1125 may be configured as or otherwise support a means for transmitting, to a first wireless device, transition information for coordinating an overlap of a first communication associated with a first duplexing mode and a second communication associated with a second duplexing mode, where the first wireless device is to transition from the first duplexing mode to the second duplexing mode during the overlap. The communications coordination component 1130 may be configured as or otherwise support a means for communicating with the first wireless device in accordance with the transition information.

In some examples, the transition information includes a DMRS placement configuration, and the DMRS placement component 1135 may be configured as or otherwise support a means for determining a set of multiple symbols allocated for DMRS based on a location of the overlap. In some examples, the transition information includes a DMRS placement configuration, and the DMRS placement component 1135 may be configured as or otherwise support a means for transmitting the DMRS placement configuration including an indication of the allocated symbols to the second wireless device. In some examples, the transition information includes a DMRS placement configuration, and the DMRS receiver component 1140 may be configured as or otherwise support a means for receiving uplink DMRS in symbols occurring before and after the overlap in accordance with the DMRS placement configuration.

In some examples, the transition information includes a DMRS placement configuration, and the DMRS placement component 1135 may be configured as or otherwise support a means for transmitting downlink DMRS in symbols occurring before and after the overlap in accordance with the DMRS placement configuration.

In some examples, the transition information includes a DMRS placement configuration, and the assistance information receiver component 1145 may be configured as or otherwise support a means for receiving, from the first wireless device, assistance information including a first set of locations for transmitting DMRS requested by the first wireless device based on the overlap.

In some examples, the DMRS placement component 1135 may be configured as or otherwise support a means for transmitting, to the first wireless device, a configuration indicating a second set of locations for transmitting DMRS, where the second set of locations is different from the first set of locations. In some examples, the assistance information receiver component 1145 may be configured as or otherwise support a means for receiving the assistance information including the requested first set of locations.

In some examples, the assistance information indicates a requested number of symbols for transmitting the DMRS, a requested location of symbols for transmitting the DMRS, a number of symbols associated with the transition from the first duplexing mode to the second duplexing mode, or any combination thereof.

In some examples, the transition information includes a transition duration configuration, and the duration configuration transmission component 1150 may be configured as or otherwise support a means for transmitting the transition duration configuration to the first wireless device, where the transition duration indicates a number of symbols affected by the transition from the first duplexing mode to the second duplexing mode.

In some examples, the duration configuration transmission component 1150 may be configured as or otherwise support a means for transmitting the transition duration configuration via a medium access control-control element (MAC-CE), a DCI, RRC message, or any combination thereof.

In some examples, the transition duration configuration is based on respective slot formats associated with one or more slots associated with the transition.

In some examples, the transition information includes a feedback configuration, and the feedback component 1155 may be configured as or otherwise support a means for receiving, from the first wireless device, a feedback transmission indicating an unsuccessful receipt or a request for retransmission of the first communication, the second communication, or both, based on the feedback configuration.

In some examples, the feedback transmission includes a multi-bit feedback transmission.

In some examples, the feedback component 1155 may be configured as or otherwise support a means for transmitting the feedback configuration from the second wireless device via a radio resource control signaling.

In some examples, the feedback transmission includes a request for the second wireless device to retransmit the first communication associated with the first duplexing mode, the second communication associated with the second duplexing mode, or both.

In some examples, the transition information includes a cancellation configuration, and the communications cancellation component 1160 may be configured as or otherwise support a means for receiving, from the first wireless device, an indication of a cancellation of one or more overlapping symbols associated with the first communication and the second communication in accordance with the cancellation configuration.

In some examples, the indication of the cancellation is multiplexed with the first communication, the second communication, or both.

In some examples, the communications cancellation component 1160 may be configured as or otherwise support a means for switching the first communication from a first transport block to a second transport block in accordance with the cancellation configuration.

In some examples, the transition information includes a multi-connection configuration, and the multi-connection component 1165 may be configured as or otherwise support a means for communicating with a third wireless device to determine the multi-connection configuration for the first wireless device. In some examples, the transition information includes a multi-connection configuration, and the multi-connection component 1165 may be configured as or otherwise support a means for transmitting the multi-connection configuration to the first wireless device, where the multi-connection configuration includes a DMRS placement configuration based on the overlap. In some examples, the transition information includes a multi-connection configuration, and the multi-connection component 1165 may be configured as or otherwise support a means for communicating with the first wireless device in accordance with the multi-connection configuration.

In some examples, the assistance information receiver component 1145 may be configured as or otherwise support a means for receiving, from the first wireless device, assistance information including a first set of requested locations for transmitting DMRS based on the overlap.

In some examples, the first duplexing mode and the second duplexing mode include either a half-duplexing mode or a full-duplexing mode.

Figure 12:
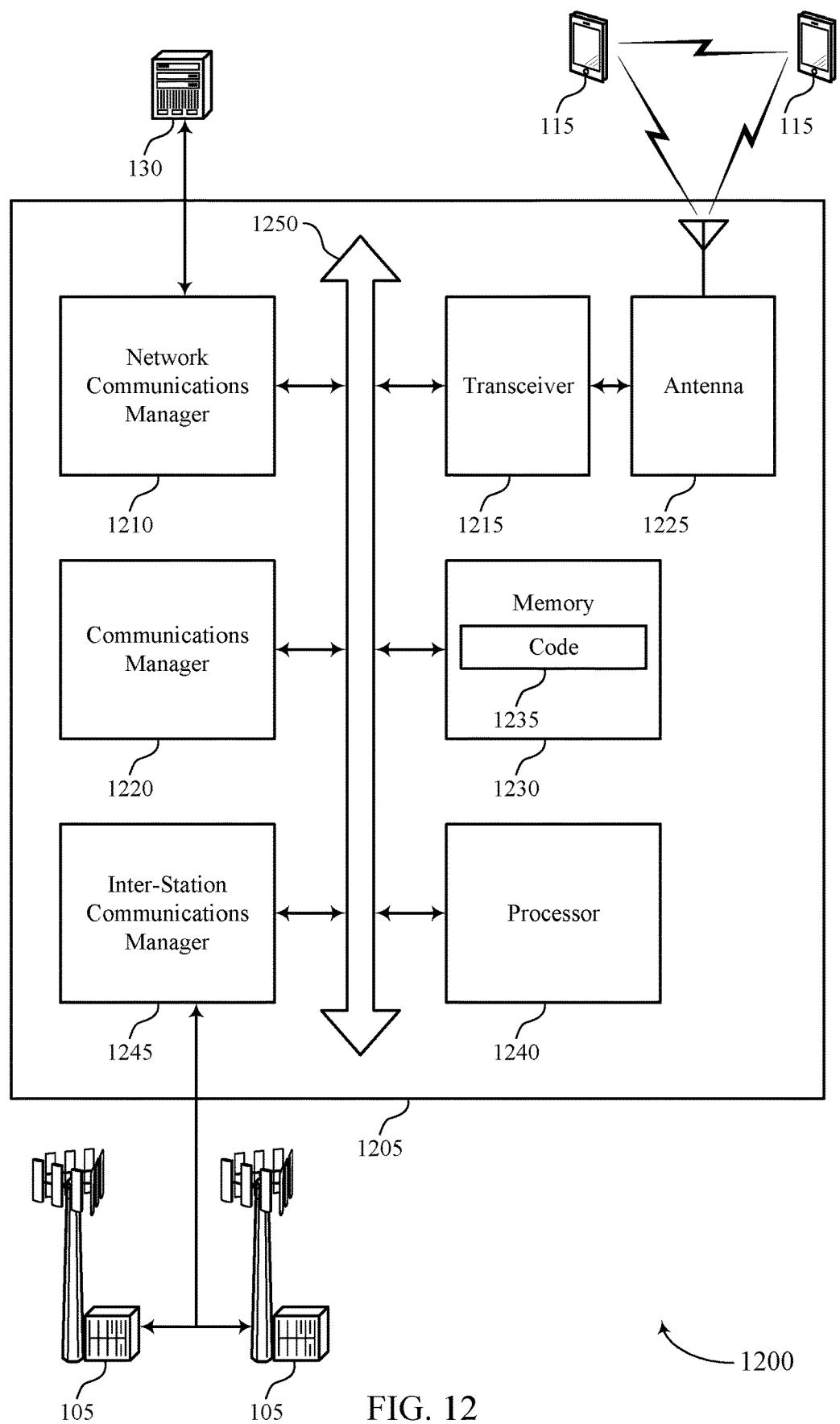
FIG. 12 shows a diagram of a system including a device that supports techniques for managing partially overlapping transmission and reception in accordance with aspects of the present disclosure.

FIG. 12 shows a diagram of a system 1200 including a device 1205 that supports techniques for managing partially overlapping transmission and reception in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for managing partially overlapping transmission and reception). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a second wireless device in accordance with examples as disclosed herein. For example, the communications manager 1220 may be configured as or otherwise support a means for transmitting, to a first wireless device, transition information for coordinating an overlap of a first communication associated with a first duplexing mode and a second communication associated with a second duplexing mode, where the first wireless device is to transition from the first duplexing mode to the second duplexing mode during the overlap. The communications manager 1220 may be configured as or otherwise support a means for communicating with the first wireless device in accordance with the transition information.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, improved channel estimation, higher throughput, and increased signaling efficiency.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for managing partially overlapping transmission and reception as described herein, or the processor 1240 and the memory 1230 may be otherwise configured to perform or support such operations.

Figure 13:
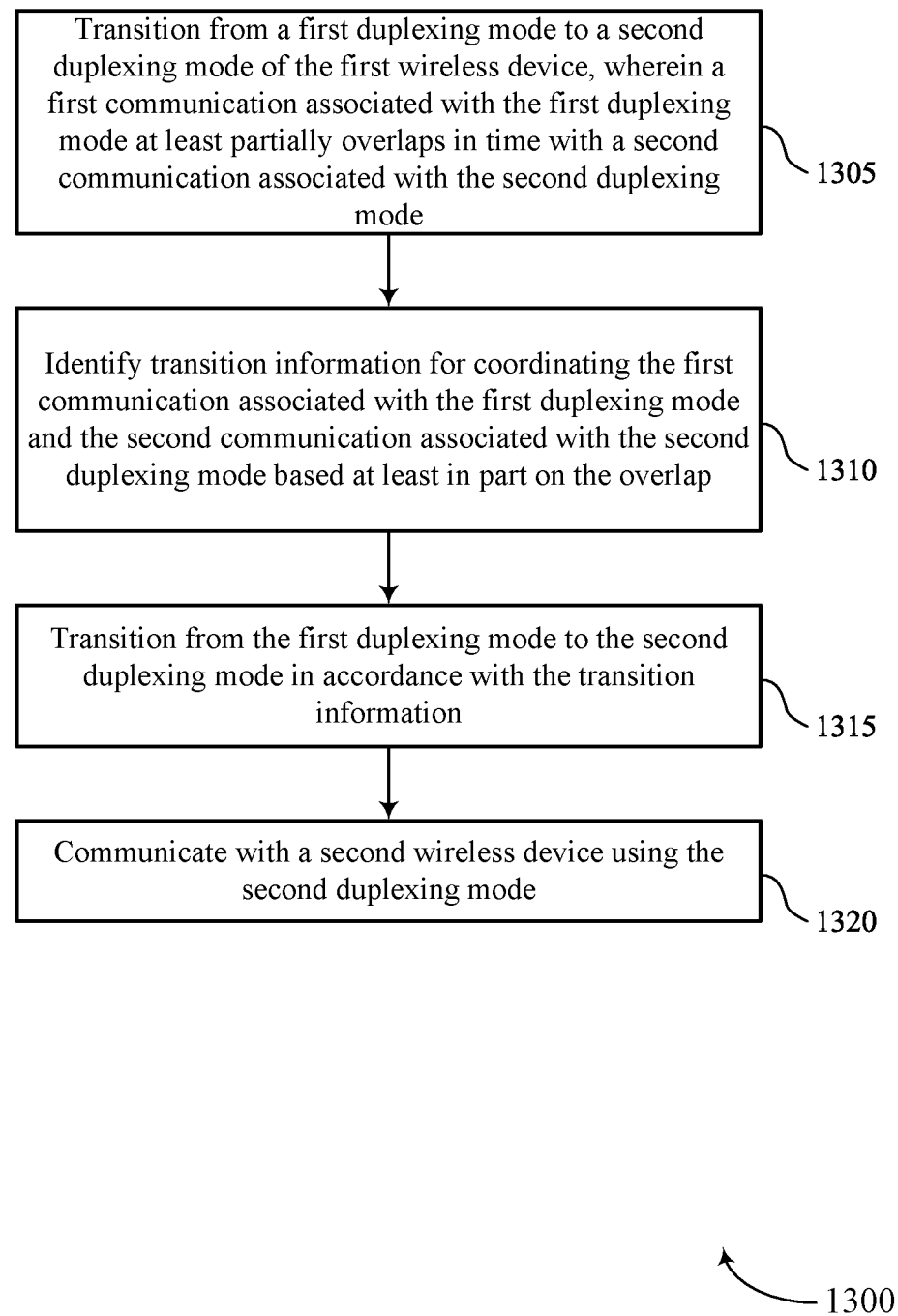
FIGS. 13 through 20 show flowcharts illustrating methods that support techniques for managing partially overlapping transmission and reception in accordance with aspects of the present disclosure.

FIG. 13 shows a flowchart illustrating a method 1300 that supports techniques for managing partially overlapping transmission and reception in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transitioning from a first duplexing mode to a second duplexing mode of the first wireless device, where a first communication associated with the first duplexing mode at least partially overlaps in time with a second communication associated with the second duplexing mode. The operations of 1305 may be performed in accordance with examples as disclosed herein. In some examples, aspects of the operations of 1305 may be performed by a duplexing mode transition component 725 as described with reference to FIG. 7.

At 1310, the method may include identifying transition information for coordinating the first communication associated with the first duplexing mode and the second communication associated with the second duplexing mode based on the overlap. The operations of 1310 may be performed in accordance with examples as disclosed herein. In some examples, aspects of the operations of 1310 may be performed by a transition coordination component 730 as described with reference to FIG. 7.

At 1315, the method may include transitioning from the first duplexing mode to the second duplexing mode in accordance with the transition information. The operations of 1315 may be performed in accordance with examples as disclosed herein. In some examples, aspects of the operations of 1315 may be performed by a transition component 735 as described with reference to FIG. 7.

At 1320, the method may include communicating with a second wireless device using the second duplexing mode. The operations of 1320 may be performed in accordance with examples as disclosed herein. In some examples, aspects of the operations of 1320 may be performed by a duplexing mode communications component 740 as described with reference to FIG. 7.

Figure 14:
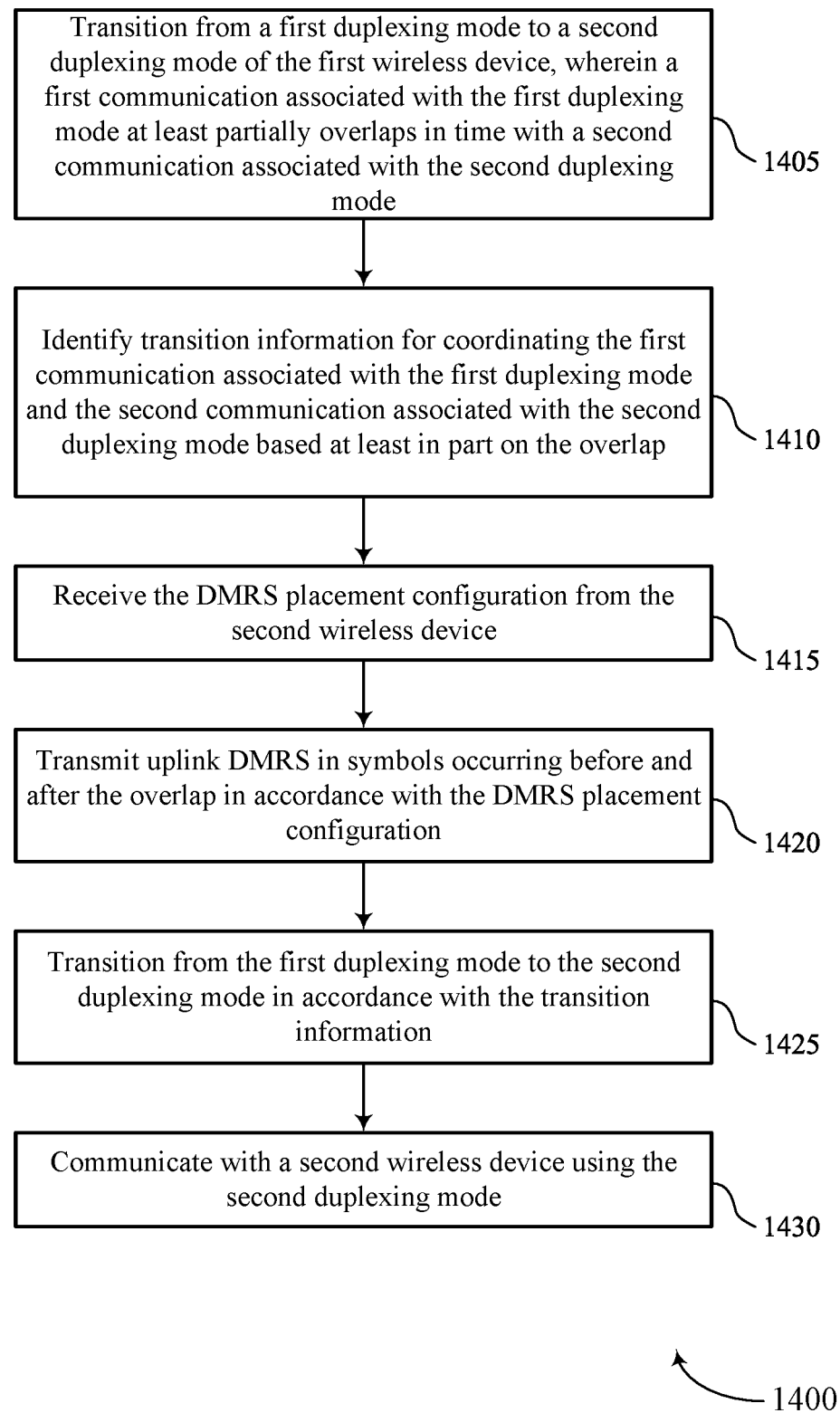

FIG. 14 shows a flowchart illustrating a method 1400 that supports techniques for managing partially overlapping transmission and reception in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transitioning from a first duplexing mode to a second duplexing mode of the first wireless device, where a first communication associated with the first duplexing mode at least partially overlaps in time with a second communication associated with the second duplexing mode. The operations of 1405 may be performed in accordance with examples as disclosed herein. In some examples, aspects of the operations of 1405 may be performed by a duplexing mode transition component 725 as described with reference to FIG. 7.

At 1410, the method may include identifying transition information for coordinating the first communication associated with the first duplexing mode and the second communication associated with the second duplexing mode based on the overlap. The operations of 1410 may be performed in accordance with examples as disclosed herein. In some examples, aspects of the operations of 1410 may be performed by a transition coordination component 730 as described with reference to FIG. 7.

At 1415, the method may include receiving the DMRS placement configuration from the second wireless device. The operations of 1415 may be performed in accordance with examples as disclosed herein. In some examples, aspects of the operations of 1415 may be performed by a DMRS placement component 745 as described with reference to FIG. 7.

At 1420, the method may include transmitting uplink DMRS in symbols occurring before and after the overlap in accordance with the DMRS placement configuration. The operations of 1420 may be performed in accordance with examples as disclosed herein. In some examples, aspects of the operations of 1420 may be performed by a DMRS placement component 745 as described with reference to FIG. 7.

At 1425, the method may include transitioning from the first duplexing mode to the second duplexing mode in accordance with the transition information. The operations of 1425 may be performed in accordance with examples as disclosed herein. In some examples, aspects of the operations of 1425 may be performed by a transition component 735 as described with reference to FIG. 7.

At 1430, the method may include communicating with a second wireless device using the second duplexing mode. The operations of 1430 may be performed in accordance with examples as disclosed herein. In some examples, aspects of the operations of 1430 may be performed by a duplexing mode communications component 740 as described with reference to FIG. 7.

Figure 15:
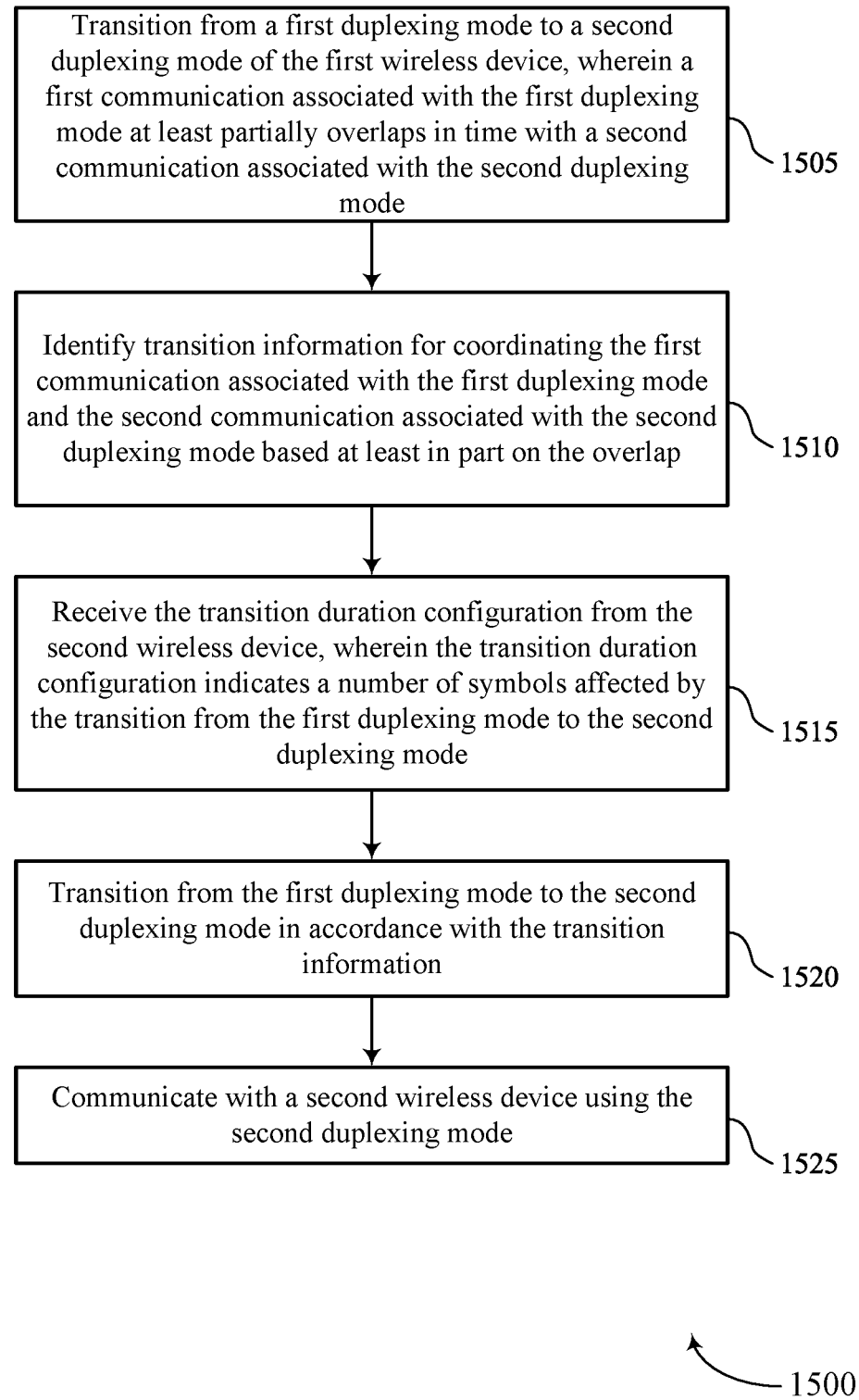

FIG. 15 shows a flowchart illustrating a method 1500 that supports techniques for managing partially overlapping transmission and reception in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transitioning from a first duplexing mode to a second duplexing mode of the first wireless device, where a first communication associated with the first duplexing mode at least partially overlaps in time with a second communication associated with the second duplexing mode. The operations of 1505 may be performed in accordance with examples as disclosed herein. In some examples, aspects of the operations of 1505 may be performed by a duplexing mode transition component 725 as described with reference to FIG. 7.

At 1510, the method may include identifying transition information for coordinating the first communication associated with the first duplexing mode and the second communication associated with the second duplexing mode based on the overlap. The operations of 1510 may be performed in accordance with examples as disclosed herein. In some examples, aspects of the operations of 1510 may be performed by a transition coordination component 730 as described with reference to FIG. 7.

At 1515, the method may include receiving the transition duration configuration from the second wireless device, where the transition duration configuration indicates a number of symbols affected by the transition from the first duplexing mode to the second duplexing mode. The operations of 1515 may be performed in accordance with examples as disclosed herein. In some examples, aspects of the operations of 1515 may be performed by a transition duration component 750 as described with reference to FIG. 7.

At 1520, the method may include transitioning from the first duplexing mode to the second duplexing mode in accordance with the transition information. The operations of 1520 may be performed in accordance with examples as disclosed herein. In some examples, aspects of the operations of 1520 may be performed by a transition component 735 as described with reference to FIG. 7.

At 1525, the method may include communicating with a second wireless device using the second duplexing mode. The operations of 1525 may be performed in accordance with examples as disclosed herein. In some examples, aspects of the operations of 1525 may be performed by a duplexing mode communications component 740 as described with reference to FIG. 7.

Figure 16:
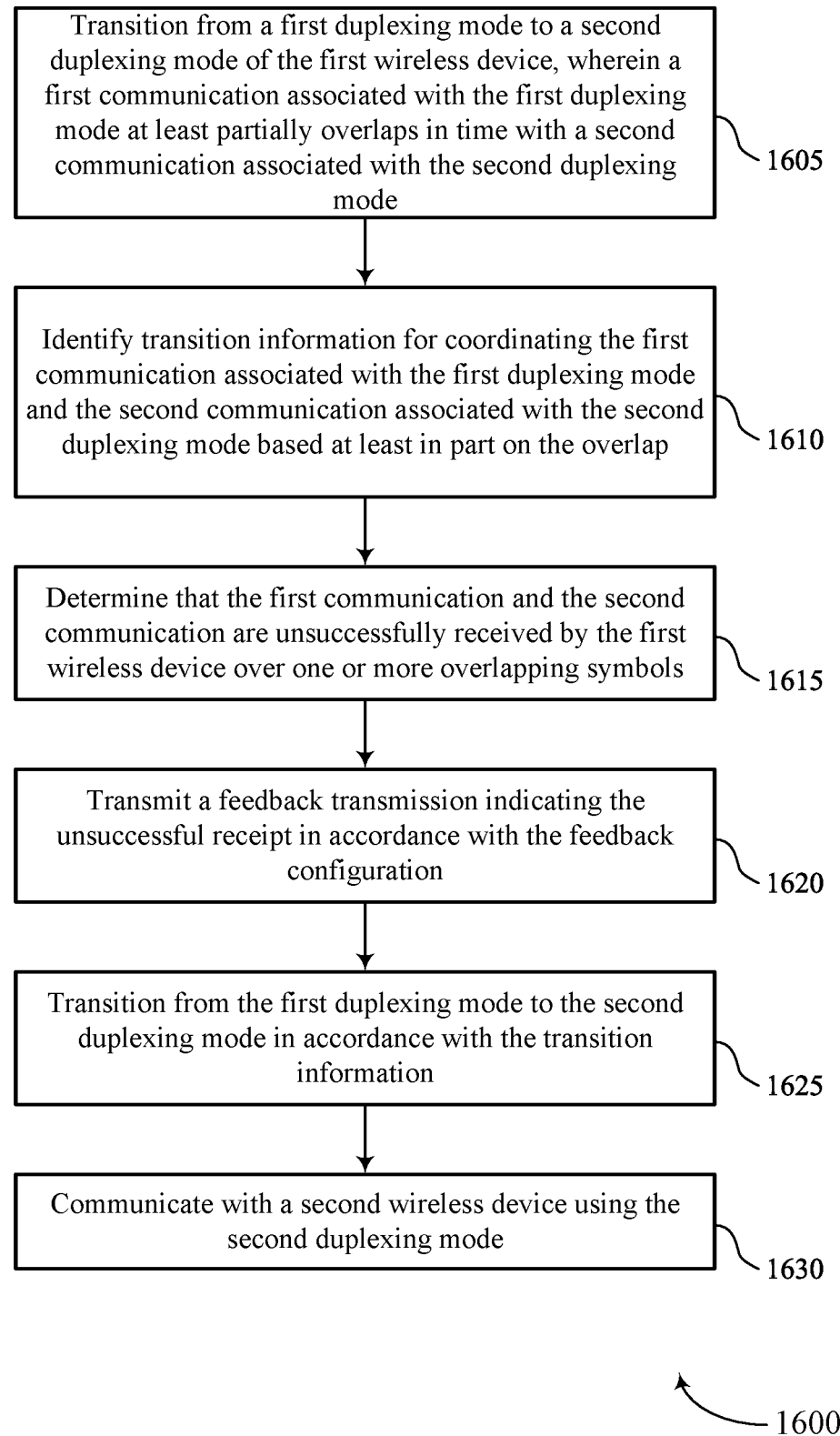

FIG. 16 shows a flowchart illustrating a method 1600 that supports techniques for managing partially overlapping transmission and reception in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include transitioning from a first duplexing mode to a second duplexing mode of the first wireless device, where a first communication associated with the first duplexing mode at least partially overlaps in time with a second communication associated with the second duplexing mode. The operations of 1605 may be performed in accordance with examples as disclosed herein. In some examples, aspects of the operations of 1605 may be performed by a duplexing mode transition component 725 as described with reference to FIG. 7.

At 1610, the method may include identifying transition information for coordinating the first communication associated with the first duplexing mode and the second communication associated with the second duplexing mode based on the overlap. The operations of 1610 may be performed in accordance with examples as disclosed herein. In some examples, aspects of the operations of 1610 may be performed by a transition coordination component 730 as described with reference to FIG. 7.

At 1615, the method may include determining that the first communication and the second communication are unsuccessfully received by the first wireless device over one or more overlapping symbols. The operations of 1615 may be performed in accordance with examples as disclosed herein. In some examples, aspects of the operations of 1615 may be performed by a feedback component 755 as described with reference to FIG. 7.

At 1620, the method may include transmitting a feedback transmission indicating the unsuccessful receipt in accordance with the feedback configuration. The operations of 1620 may be performed in accordance with examples as disclosed herein. In some examples, aspects of the operations of 1620 may be performed by a feedback component 755 as described with reference to FIG. 7.

At 1625, the method may include transitioning from the first duplexing mode to the second duplexing mode in accordance with the transition information. The operations of 1625 may be performed in accordance with examples as disclosed herein. In some examples, aspects of the operations of 1625 may be performed by a transition component 735 as described with reference to FIG. 7.

At 1630, the method may include communicating with a second wireless device using the second duplexing mode. The operations of 1630 may be performed in accordance with examples as disclosed herein. In some examples, aspects of the operations of 1630 may be performed by a duplexing mode communications component 740 as described with reference to FIG. 7.

Figure 17:
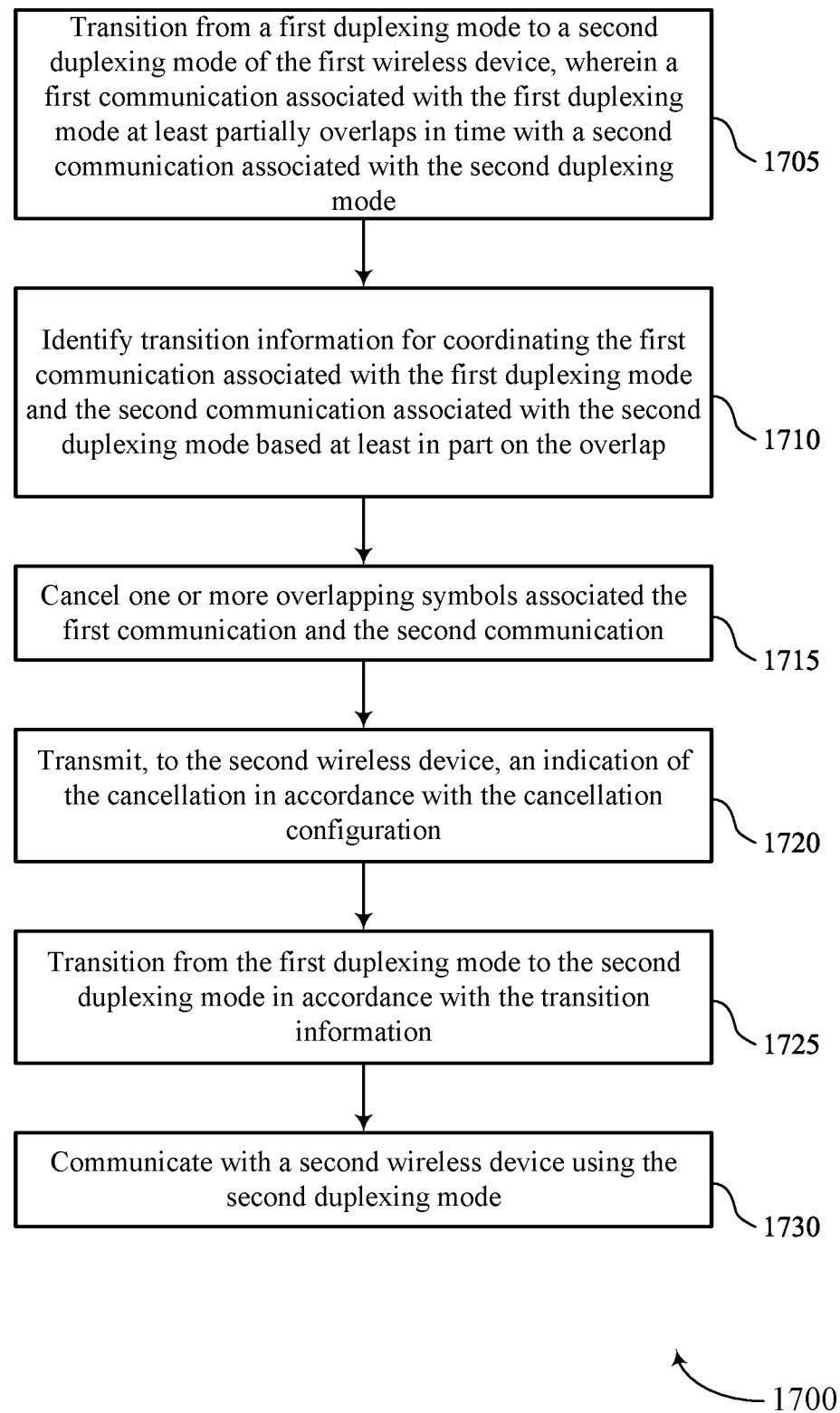

FIG. 17 shows a flowchart illustrating a method 1700 that supports techniques for managing partially overlapping transmission and reception in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include transitioning from a first duplexing mode to a second duplexing mode of the first wireless device, where a first communication associated with the first duplexing mode at least partially overlaps in time with a second communication associated with the second duplexing mode. The operations of 1705 may be performed in accordance with examples as disclosed herein. In some examples, aspects of the operations of 1705 may be performed by a duplexing mode transition component 725 as described with reference to FIG. 7.

At 1710, the method may include identifying transition information for coordinating the first communication associated with the first duplexing mode and the second communication associated with the second duplexing mode based on the overlap. The operations of 1710 may be performed in accordance with examples as disclosed herein. In some examples, aspects of the operations of 1710 may be performed by a transition coordination component 730 as described with reference to FIG. 7.

At 1715, the method may include cancelling one or more overlapping symbols associated the first communication and the second communication. The operations of 1715 may be performed in accordance with examples as disclosed herein. In some examples, aspects of the operations of 1715 may be performed by a communications cancellation component 760 as described with reference to FIG. 7.

At 1720, the method may include transmitting, to the second wireless device, an indication of the cancellation in accordance with the cancellation configuration. The operations of 1720 may be performed in accordance with examples as disclosed herein. In some examples, aspects of the operations of 1720 may be performed by a communications cancellation component 760 as described with reference to FIG. 7.

At 1725, the method may include transitioning from the first duplexing mode to the second duplexing mode in accordance with the transition information. The operations of 1725 may be performed in accordance with examples as disclosed herein. In some examples, aspects of the operations of 1725 may be performed by a transition component 735 as described with reference to FIG. 7.

At 1730, the method may include communicating with a second wireless device using the second duplexing mode. The operations of 1730 may be performed in accordance with examples as disclosed herein. In some examples, aspects of the operations of 1730 may be performed by a duplexing mode communications component 740 as described with reference to FIG. 7.

Figure 18:
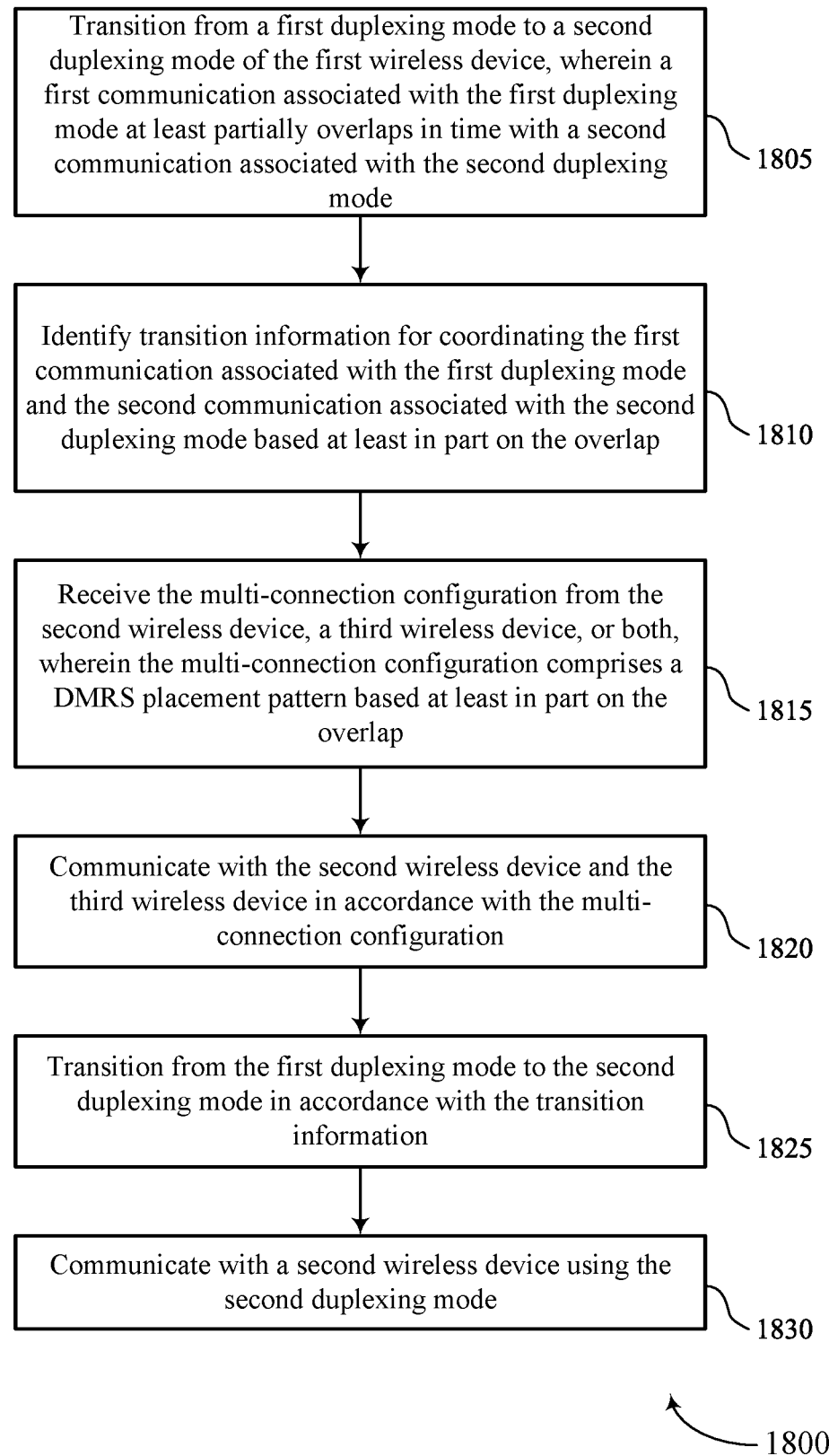

FIG. 18 shows a flowchart illustrating a method 1800 that supports techniques for managing partially overlapping transmission and reception in accordance with aspects of the present disclosure. The operations of the method 1800 may be implemented by a UE or its components as described herein. For example, the operations of the method 1800 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1805, the method may include transitioning from a first duplexing mode to a second duplexing mode of the first wireless device, where a first communication associated with the first duplexing mode at least partially overlaps in time with a second communication associated with the second duplexing mode. The operations of 1805 may be performed in accordance with examples as disclosed herein. In some examples, aspects of the operations of 1805 may be performed by a duplexing mode transition component 725 as described with reference to FIG. 7.

At 1810, the method may include identifying transition information for coordinating the first communication associated with the first duplexing mode and the second communication associated with the second duplexing mode based on the overlap. The operations of 1810 may be performed in accordance with examples as disclosed herein. In some examples, aspects of the operations of 1810 may be performed by a transition coordination component 730 as described with reference to FIG. 7.

At 1815, the method may include receiving the multi-connection configuration from the second wireless device, a third wireless device, or both, where the multi-connection configuration includes a DMRS placement pattern based on the overlap. The operations of 1815 may be performed in accordance with examples as disclosed herein. In some examples, aspects of the operations of 1815 may be performed by a DMRS placement component 745 as described with reference to FIG. 7.

At 1820, the method may include communicating with the second wireless device and the third wireless device in accordance with the multi-connection configuration. The operations of 1820 may be performed in accordance with examples as disclosed herein. In some examples, aspects of the operations of 1820 may be performed by a communications switching component 765 as described with reference to FIG. 7.

At 1825, the method may include transitioning from the first duplexing mode to the second duplexing mode in accordance with the transition information. The operations of 1825 may be performed in accordance with examples as disclosed herein. In some examples, aspects of the operations of 1825 may be performed by a transition component 735 as described with reference to FIG. 7.

At 1830, the method may include communicating with a second wireless device using the second duplexing mode. The operations of 1830 may be performed in accordance with examples as disclosed herein. In some examples, aspects of the operations of 1830 may be performed by a duplexing mode communications component 740 as described with reference to FIG. 7.

Figure 19:
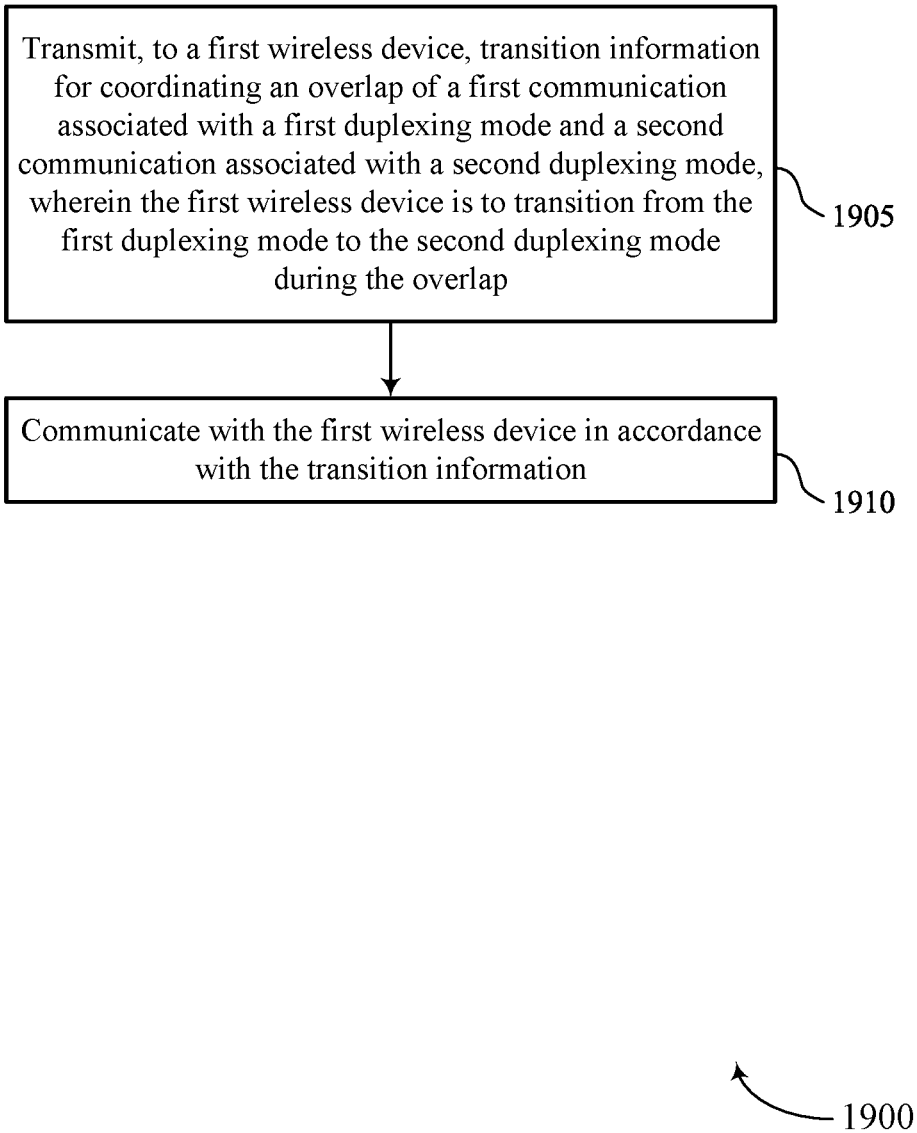

FIG. 19 shows a flowchart illustrating a method 1900 that supports techniques for managing partially overlapping transmission and reception in accordance with aspects of the present disclosure. The operations of the method 1900 may be implemented by a base station or its components as described herein. For example, the operations of the method 1900 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1905, the method may include transmitting, to a first wireless device, transition information for coordinating an overlap of a first communication associated with a first duplexing mode and a second communication associated with a second duplexing mode, where the first wireless device is to transition from the first duplexing mode to the second duplexing mode during the overlap. The operations of 1905 may be performed in accordance with examples as disclosed herein. In some examples, aspects of the operations of 1905 may be performed by a communications coordination component 1125 as described with reference to FIG. 11.

At 1910, the method may include communicating with the first wireless device in accordance with the transition information. The operations of 1910 may be performed in accordance with examples as disclosed herein. In some examples, aspects of the operations of 1910 may be performed by a communications coordination component 1130 as described with reference to FIG. 11.

Figure 20:
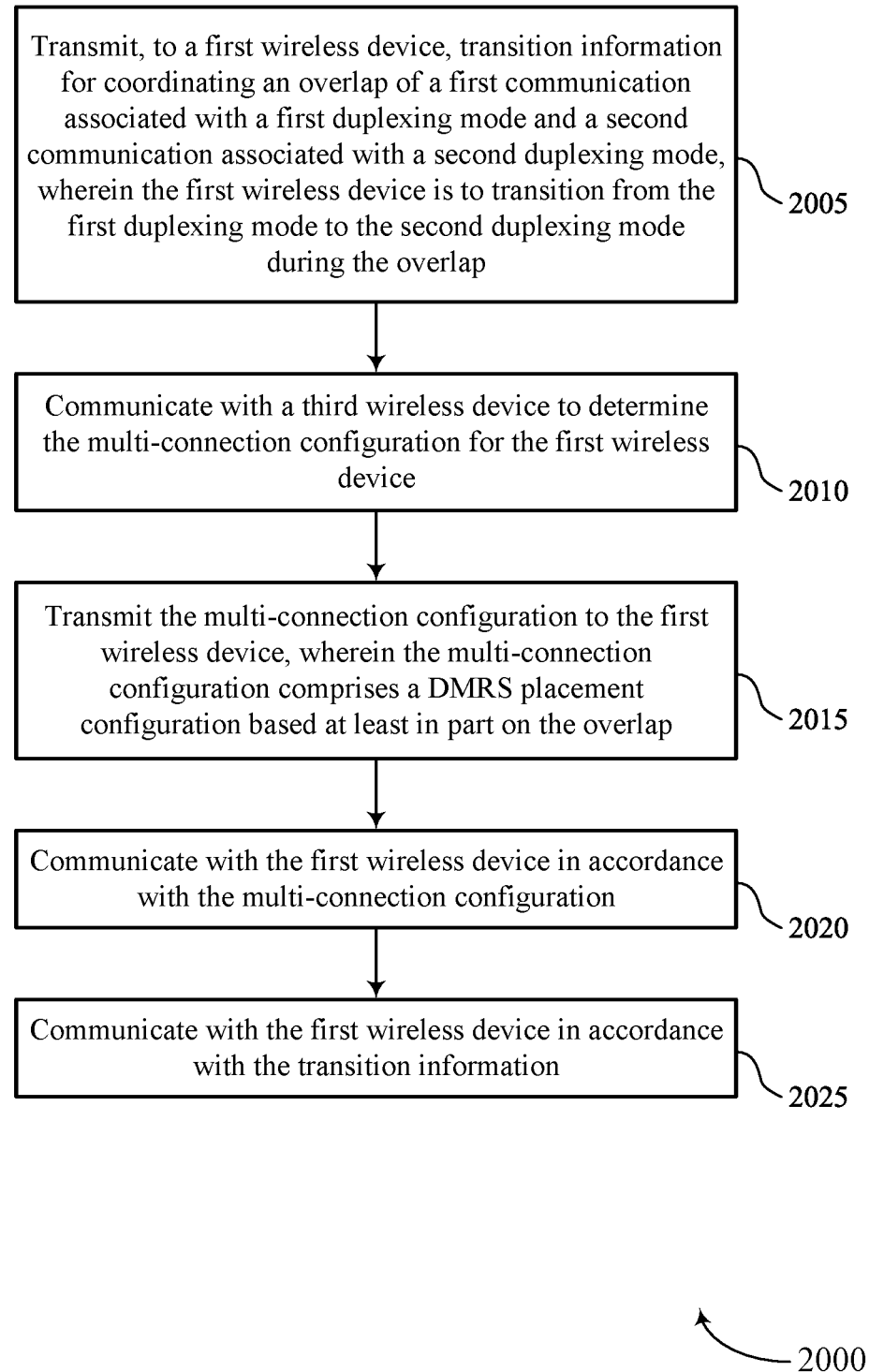

FIG. 20 shows a flowchart illustrating a method 2000 that supports techniques for managing partially overlapping transmission and reception in accordance with aspects of the present disclosure. The operations of the method 2000 may be implemented by a base station or its components as described herein. For example, the operations of the method 2000 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 2005, the method may include transmitting, to a first wireless device, transition information for coordinating an overlap of a first communication associated with a first duplexing mode and a second communication associated with a second duplexing mode, where the first wireless device is to transition from the first duplexing mode to the second duplexing mode during the overlap. The operations of 2005 may be performed in accordance with examples as disclosed herein. In some examples, aspects of the operations of 2005 may be performed by a communications coordination component 1125 as described with reference to FIG. 11.

At 2010, the method may include communicating with a third wireless device to determine the multi-connection configuration for the first wireless device. The operations of 2010 may be performed in accordance with examples as disclosed herein. In some examples, aspects of the operations of 2010 may be performed by a multi-connection component 1165 as described with reference to FIG. 11.

At 2015, the method may include transmitting the multi-connection configuration to the first wireless device, where the multi-connection configuration includes a DMRS placement configuration based on the overlap. The operations of 2015 may be performed in accordance with examples as disclosed herein. In some examples, aspects of the operations of 2015 may be performed by a multi-connection component 1165 as described with reference to FIG. 11.

At 2020, the method may include communicating with the first wireless device in accordance with the multi-connection configuration. The operations of 2020 may be performed in accordance with examples as disclosed herein. In some examples, aspects of the operations of 2020 may be performed by a multi-connection component 1165 as described with reference to FIG. 11.

At 2025, the method may include communicating with the first wireless device in accordance with the transition information. The operations of 2025 may be performed in accordance with examples as disclosed herein. In some examples, aspects of the operations of 2025 may be performed by a communications coordination component 1130 as described with reference to FIG. 11.

The following provides an overview of aspects of the present disclosure:

Aspect 1: A method for wireless communications at a first wireless device, comprising: transitioning from a first duplexing mode to a second duplexing mode of the first wireless device, wherein a first communication associated with the first duplexing mode at least partially overlaps in time with a second communication associated with the second duplexing mode; identifying transition information for coordinating the first communication associated with the first duplexing mode and the second communication associated with the second duplexing mode based at least in part on the overlap; transitioning from the first duplexing mode to the second duplexing mode in accordance with the transition information; and communicating with a second wireless device using the second duplexing mode.

Aspect 2: The method of aspect 1, wherein the transition information comprises a DMRS placement configuration, the method further comprising: receiving the DMRS placement configuration from the second wireless device; and transmitting uplink DMRS in symbols occurring before and after the overlap in accordance with the DMRS placement configuration.

Aspect 3: The method of any of aspects 1 through 2, wherein the transition information comprises a DMRS placement configuration, the method further comprising: receiving, from the second wireless device, downlink DMRS in symbols occurring before and after the overlap in accordance with the DMRS placement configuration.

Aspect 4: The method of any of aspects 1 through 3, wherein the transition information comprises a DMRS placement configuration, the method further comprising: transmitting, to the second wireless device, assistance information comprising a first set of locations for transmitting DMRS requested by the first wireless device based at least in part on the overlap.

Aspect 5: The method of aspect 4, further comprising: receiving, from the second wireless device, a configuration indicating a second set of locations for transmitting DMRS, wherein the second set of locations is different from the first set of locations; and transmitting the assistance information to notify the second wireless device of the requested first set of locations.

Aspect 6: The method of any of aspects 4 through 5, wherein the assistance information indicates a requested number of symbols for transmitting the DMRS, a requested location of symbols for transmitting the DMRS, a number of symbols associated with the transition from the first duplexing mode to the second duplexing mode, or any combination thereof.

Aspect 7: The method of any of aspects 1 through 6, wherein the transition information comprises a transition duration configuration, the method further comprising: receiving the transition duration configuration from the second wireless device, wherein the transition duration configuration indicates a number of symbols affected by the transition from the first duplexing mode to the second duplexing mode.

Aspect 8: The method of aspect 7, further comprising: refraining from communicating with the second wireless device during the number of symbols affected by the transition in accordance with the transition duration configuration.

Aspect 9: The method of any of aspects 7 through 8, further comprising: receiving the transition duration configuration via a MAC-CE, a DCI, RRC message, or any combination thereof.

Aspect 10: The method of any of aspects 7 through 9, wherein the transition duration configuration is based at least in part on respective slot formats associated with one or more slots associated with the transition.

Aspect 11: The method of any of aspects 1 through 10, wherein the transition information comprises a feedback configuration, the method further comprising: determining that the first communication and the second communication are unsuccessfully received by the first wireless device over one or more overlapping symbols; and transmitting a feedback transmission indicating the unsuccessful receipt in accordance with the feedback configuration.

Aspect 12: The method of aspect 11, wherein the feedback transmission comprises a multi-bit feedback transmission.

Aspect 13: The method of any of aspects 11 through 12, further comprising: receiving the feedback configuration from the second wireless device via RRC signaling.

Aspect 14: The method of any of aspects 11 through 13, wherein the feedback transmission comprises a request for the second wireless device to retransmit the first communication associated with the first duplexing mode, the second communication associated with the second duplexing mode, or both.

Aspect 15: The method of any of aspects 1 through 14, wherein the transition information comprises a cancellation configuration, the method further comprising: cancelling one or more overlapping symbols associated the first communication and the second communication; and transmitting, to the second wireless device, an indication of the cancellation in accordance with the cancellation configuration.

Aspect 16: The method of aspect 15, wherein the indication of the cancellation is multiplexed with the first communication, the second communication, or both.

Aspect 17: The method of any of aspects 15 through 16, further comprising: switching the first communication and the second communication from a first transport block to a second transport block in accordance with the cancellation configuration.

Aspect 18: The method of any of aspects 1 through 17, wherein the transition information comprises a multi-connection configuration, the method further comprising: receiving the multi-connection configuration from the second wireless device, a third wireless device, or both, wherein the multi-connection configuration comprises a DMRS placement pattern based at least in part on the overlap; and communicating with the second wireless device and the third wireless device in accordance with the multi-connection configuration.

Aspect 19: The method of aspect 18, further comprising: transmitting, to the second wireless device, the third wireless device, or both, assistance information comprising a first set of requested locations for transmitting DMRS based at least in part on the overlap.

Aspect 20: The method of any of aspects 1 through 19, wherein the first duplexing mode and the second duplexing mode comprise either a half-duplexing mode or a full-duplexing mode.

Aspect 21: A method for wireless communications at a second wireless device, comprising: transmitting, to a first wireless device, transition information for coordinating an overlap of a first communication associated with a first duplexing mode and a second communication associated with a second duplexing mode, wherein the first wireless device is to transition from the first duplexing mode to the second duplexing mode during the overlap; and communicating with the first wireless device in accordance with the transition information.

Aspect 22: The method of aspect 21, wherein the transition information comprises a DMRS placement configuration, the method further comprising: determining a plurality of symbols allocated for DMRS based at least in part on a location of the overlap; transmitting the DMRS placement configuration comprising an indication of the allocated symbols to the second wireless device; and receiving uplink DMRS in symbols occurring before and after the overlap in accordance with the DMRS placement configuration.

Aspect 23: The method of any of aspects 21 through 22, wherein the transition information comprises a DMRS placement configuration, the method further comprising: transmitting downlink DMRS in symbols occurring before and after the overlap in accordance with the DMRS placement configuration.

Aspect 24: The method of any of aspects 21 through 23, wherein the transition information comprises a DMRS placement configuration, the method further comprising: receiving, from the first wireless device, assistance information comprising a first set of locations for transmitting DMRS requested by the first wireless device based at least in part on the overlap.

Aspect 25: The method of aspect 24, further comprising: transmitting, to the first wireless device, a configuration indicating a second set of locations for transmitting DMRS, wherein the second set of locations is different from the first set of locations; and receiving the assistance information comprising the requested first set of locations.

Aspect 26: The method of any of aspects 24 through 25, wherein the assistance information indicates a requested number of symbols for transmitting the DMRS, a requested location of symbols for transmitting the DMRS, a number of symbols associated with the transition from the first duplexing mode to the second duplexing mode, or any combination thereof.

Aspect 27: The method of any of aspects 21 through 26, wherein the transition information comprises a transition duration configuration, the method further comprising: transmitting the transition duration configuration to the first wireless device, wherein the transition duration indicates a number of symbols affected by the transition from the first duplexing mode to the second duplexing mode.

Aspect 28: The method of aspect 27, further comprising: transmitting the transition duration configuration via a MAC-CE, a DCI, RRC message, or any combination thereof.

Aspect 29: An apparatus for wireless communications at a first wireless device, comprising a processor; memory coupled with the processor; and instructions stored in the memory and executable by the processor to cause the apparatus to perform a method of any of aspects 1 through 20.

Aspect 30: An apparatus for wireless communications at a first wireless device, comprising at least one means for performing a method of any of aspects 1 through 20.

Aspect 31: A non-transitory computer-readable medium storing code for wireless communications at a first wireless device, the code comprising instructions executable by a processor to perform a method of any of aspects 1 through 20.

Aspect 32: An apparatus for wireless communications at a second wireless device, comprising a processor; memory coupled with the processor; and instructions stored in the memory and executable by the processor to cause the apparatus to perform a method of any of aspects 21 through 28.

Aspect 33: An apparatus for wireless communications at a second wireless device, comprising at least one means for performing a method of any of aspects 21 through 28.

Aspect 34: A non-transitory computer-readable medium storing code for wireless communications at a second wireless device, the code comprising instructions executable by a processor to perform a method of any of aspects 21 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
    receiving, from a second wireless device, transition information comprising a demodulation reference signal (DMRS) placement configuration for coordinating a first communication associated with a first duplexing mode of the first wireless device and a second communication associated with a second duplexing mode of the first wireless device, the first communication at least partially overlapping in time with the second communication, wherein the DMRS placement configuration is based at least in part on the overlap;
    transmitting uplink DMRS in symbols occurring before and after the overlap in accordance with the DMRS placement configuration;

transitioning from the first duplexing mode to the second duplexing mode in accordance with the transition information and the DMRS placement configuration; and
communicating with the second wireless device using the second duplexing mode.

2. The method of claim 1, further comprising:
receiving, from the second wireless device, downlink DMRS in second symbols occurring before and after the overlap in accordance with the DMRS placement configuration.

3. The method of claim 1, further comprising:
transmitting, to the second wireless device, assistance information comprising a first set of locations, for transmitting DMRS, requested by the first wireless device based at least in part on the overlap.

4. The method of claim 3, further comprising:
receiving, from the second wireless device, a configuration indicating a second set of locations for transmitting the DMRS, wherein the second set of locations is different from the first set of locations; and
transmitting the assistance information to notify the second wireless device of the requested first set of locations.

5. The method of claim 3, wherein the assistance information indicates a requested number of symbols for transmitting the DMRS, a requested location of symbols for transmitting the DMRS, a number of symbols associated with the transition from the first duplexing mode to the second duplexing mode, or any combination thereof.

6. The method of claim 1, wherein the transition information comprises a transition duration configuration, the method further comprising:
receiving the transition duration configuration from the second wireless device, wherein the transition duration configuration indicates a number of symbols affected by the transition from the first duplexing mode to the second duplexing mode.

7. The method of claim 6, further comprising:
refraining from communicating with the second wireless device during the number of symbols affected by the transition in accordance with the transition duration configuration.

8. The method of claim 6, further comprising:
receiving the transition duration configuration via a medium access control-control element (MAC-CE), a downlink control information (DCI), radio resource control (RRC) message, or any combination thereof.

9. The method of claim 6, wherein the transition duration configuration is based at least in part on respective slot formats associated with one or more slots associated with the transition.

10. The method of claim 1, wherein the transition information comprises a feedback configuration, the method further comprising:
determining that the first communication and the second communication are unsuccessfully received by the first wireless device over one or more overlapping symbols; and
transmitting a feedback transmission indicating the unsuccessful receipt in accordance with the feedback configuration.

11. The method of claim 10, wherein the feedback transmission comprises a multi-bit feedback transmission.

12. The method of claim 10, further comprising:
receiving the feedback configuration from the second wireless device via radio resource control signaling.

13. The method of claim 10, wherein the feedback transmission comprises a request for the second wireless device to retransmit the first communication associated with the first duplexing mode, the second communication associated with the second duplexing mode, or both.

14. The method of claim 1, wherein the transition information comprises a cancellation configuration, the method further comprising:
cancelling one or more overlapping symbols associated the first communication and the second communication; and
transmitting, to the second wireless device, an indication of the cancellation in accordance with the cancellation configuration.

15. The method of claim 14, wherein the indication of the cancellation is multiplexed with the first communication, the second communication, or both.

16. The method of claim 14, further comprising:
switching the first communication and the second communication from a first transport block to a second transport block in accordance with the cancellation configuration.

17. The method of claim 1, wherein the transition information comprises a multi-connection configuration, the method further comprising:
receiving the multi-connection configuration from the second wireless device, a third wireless device, or both, wherein the multi-connection configuration comprises a demodulation reference signal (DMRS) placement pattern based at least in part on the overlap; and
communicating with the second wireless device and the third wireless device in accordance with the multi-connection configuration.

18. The method of claim 17, further comprising:
transmitting, to the second wireless device, the third wireless device, or both, assistance information comprising a first set of requested locations for transmitting DMRS based at least in part on the overlap.

19. The method of claim 1, wherein the first duplexing mode comprises one of a half-duplexing mode or a full-duplexing mode, and the second duplexing mode comprises another one of the half-duplexing mode or the full-duplexing mode.

20. A method for wireless communications at a second wireless device, comprising:
transmitting, to a first wireless device, transition information comprising a demodulation reference signal (DMRS) placement configuration for coordinating an overlap of a first communication associated with a first duplexing mode and a second communication associated with a second duplexing mode, wherein the first wireless device is to transition from the first duplexing mode to the second duplexing mode during the overlap;
receiving uplink DMRS in symbols occurring before and after the overlap in accordance with the DMRS placement configuration; and
communicating with the first wireless device in accordance with the transition information and the DMRS placement configuration.

21. The method of claim 20, further comprising:
determining a plurality of symbols allocated for DMRS based at least in part on a location of the overlap; and
transmitting the DMRS placement configuration comprising an indication of the allocated symbols to the second wireless device.

22. The method of claim 20, further comprising:
transmitting downlink DMRS in second symbols occurring before and after the overlap in accordance with the DMRS placement configuration.

23. The method of claim 20, further comprising:
receiving, from the first wireless device, assistance information comprising a first set of locations, for transmitting DMRS, requested by the first wireless device based at least in part on the overlap.

24. The method of claim 23, further comprising:
transmitting, to the first wireless device, a configuration indicating a second set of locations for transmitting the DMRS, wherein the second set of locations is different from the first set of locations; and
receiving the assistance information comprising the requested first set of locations.

25. The method of claim 23, wherein the assistance information indicates a requested number of symbols for transmitting the DMRS, a requested location of symbols for transmitting the DMRS, a number of symbols associated with the transition from the first duplexing mode to the second duplexing mode, or any combination thereof.

26. The method of claim 20, wherein the transition information comprises a transition duration configuration, the method further comprising:
transmitting the transition duration configuration to the first wireless device,
wherein the transition duration indicates a number of symbols affected by the transition from the first duplexing mode to the second duplexing mode.

27. The method of claim 26, further comprising:
transmitting the transition duration configuration via a medium access control-control element (MAC-CE), a downlink control information (DCI), radio resource control (RRC) message, or any combination thereof.

28. An apparatus for wireless communications at a first wireless device, comprising:
a processor;
memory coupled with the processor; and
instructions stored in the memory and executable by the processor to cause the apparatus to:
receive, from a second wireless device, transition information comprising a demodulation reference signal (DMRS) placement configuration for coordinating a first communication associated with a first duplexing mode of the first wireless device and a second communication associated with a second duplexing mode of the first wireless device, wherein the first communication at least partially overlapping in time with the second communication, wherein the DMRS placement configuration is based at least in part on the overlap;
transmit uplink DMRS in symbols occurring before and after the overlap in accordance with the DMRS placement configuration;
transition from the first duplexing mode to the second duplexing mode in accordance with the transition information and the DMRS placement configuration; and
communicate with the second wireless device using the second duplexing mode.

29. An apparatus for wireless communications at a second wireless device, comprising:
a processor;
memory coupled with the processor; and
instructions stored in the memory and executable by the processor to cause the apparatus to:
transmit, to a first wireless device, transition information comprising a demodulation reference signal (DMRS) placement configuration for coordinating an overlap of a first communication associated with a first duplexing mode and a second communication associated with a second duplexing mode, wherein the first wireless device is to transition from the first duplexing mode to the second duplexing mode during the overlap;
receive uplink DMRS in symbols occurring before and after the overlap in accordance with the DMRS placement configuration; and
communicate with the first wireless device in accordance with the transition information and the DMRS placement configuration.

* * * * *